(12) United States Patent
Kawanishi et al.

(10) Patent No.: US 7,566,837 B2
(45) Date of Patent: Jul. 28, 2009

(54) COMBINATION WEIGHER

(75) Inventors: Shozo Kawanishi, Nishinomiya (JP); Hiroshi Higuchi, Takasago (JP); Taketoshi Okamura, Ashiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 0 days.

(21) Appl. No.: 11/575,469

(22) PCT Filed: Sep. 16, 2005

(86) PCT No.: PCT/JP2005/017115

§ 371 (c)(1), (2), (4) Date: Aug. 30, 2007

(87) PCT Pub. No.: WO2006/033290

PCT Pub. Date: Mar. 30, 2006

(65) Prior Publication Data

US 2008/0047761 A1 Feb. 28, 2008

(30) Foreign Application Priority Data

Sep. 22, 2004 (JP) ............................. 2004-274570
Mar. 24, 2005 (JP) ............................. 2005-086005
Apr. 19, 2005 (JP) ............................. 2005-121168

(51) Int. Cl.
*G01G 19/387* (2006.01)

(52) U.S. Cl. ................................... 177/25.18

(58) Field of Classification Search ............... 177/25.18
See application file for complete search history.

(56) References Cited

U.S. PATENT DOCUMENTS

| | | | | | |
|---|---|---|---|---|---|
| 4,399,880 A | * | 8/1983 | Konishi | ........................ | 177/1 |
| 4,544,042 A | * | 10/1985 | Mikami | ..................... | 177/25.18 |
| 4,676,325 A | * | 6/1987 | Yamano et al. | ................. | 177/1 |
| 4,676,326 A | * | 6/1987 | Konishi | ......................... | 177/1 |
| 4,840,240 A | * | 6/1989 | Toyoda et al. | ............ | 177/25.18 |
| 4,844,190 A | * | 7/1989 | Mikami et al. | ........... | 177/25.18 |
| 4,858,708 A | * | 8/1989 | Kohno | ...................... | 177/25.18 |
| 4,901,807 A | * | 2/1990 | Muskat et al. | ........... | 177/25.18 |
| 4,907,769 A | * | 3/1990 | Hunley et al. | ............ | 248/185.1 |
| 4,967,856 A | * | 11/1990 | Kawanishi et al. | ....... | 177/25.18 |

FOREIGN PATENT DOCUMENTS

| | | |
|---|---|---|
| JP | 4-3236 | 1/1985 |
| JP | 08-01395 | 1/1996 |

* cited by examiner

*Primary Examiner*—Randy W Gibson
(74) *Attorney, Agent, or Firm*—Marshall, Gerstein & Borun LLP

(57) ABSTRACT

The combination weigher of the present invention comprises a plurality of groups of combination hoppers which are a plurality of hopper lines of arcuate sections composing a line of combination hoppers including a plurality of circularly arranged combination hoppers (4); a control means (21) for performing a combination calculation for each of the groups of combination hoppers, selecting combination hoppers so that the total weight of the objects to be weighed therein falls within a predetermined weight range, and discharging the objects to be weighed from the selected combination hoppers; a plurality of collecting chutes (6A-6D) disposed below the groups of combination hoppers to correspond to the groups of the combination hoppers, respectively; and a plurality of collecting hoppers (7A-7D) provided to correspond to the collecting chutes, respectively, for temporarily retaining the objects to be weighed discharged from the collecting chutes, and then discharging the objects into an inlet of the packaging machine, and the control means discharges the objects to be weighed from each of the collecting hoppers sequentially.

18 Claims, 11 Drawing Sheets

(a)

(b)

(a)

(b)

COMBINATION WEIGHER

TECHNICAL FIELD

The present invention relates to a combination weigher which feeds objects to be weighed to a packaging machine.

BACKGROUND ART

Objects to be weighed, such as detergents and confectionary, which are weighed by a combination weigher to have a predetermined weight, are generally packaged by a packaging machine. A structural outline of a conventional combination weigher which measures objects to be weighed is shown in FIG. 12. Moreover, the structural outline of a packaging machine placed below the combination weigher is shown in FIG. 13.

The combination weigher shown in FIG. 12, whose operation is entirely controlled by a control unit 20, is provided with a dispersion feeder 1 at the center of an upper part of the apparatus, the dispersion feeder 1 having conical shape and radially dispersing objects to be weighed supplied from an external feeding device by vibration. Around the dispersion feeder 1, linear feeders 2 are provided for transferring the objects to be weighed sent from the dispersion feeder 1 into each of feeding hoppers 3 by vibration. A plurality of feeding hoppers 3 and weighing hoppers 4 are disposed below the linear feeders 2 and are arranged circularly in such a manner that each feeding hopper 3 and each weighing hopper 4 correspond to the associated one of the linear hopper 2. The feeding hoppers 3 receive the objects to be weighed transferred from the linear feeders 2 and open gates thereof when the weighing hoppers 4 disposed therebelow become empty to feed the objects to be weighed to the weighing hoppers 4. Weight sensors 41 such as load cells are attached to the weighing hoppers 4, and the weight of the objects to be weighed inside the weighing hoppers 4 is measured by these weight sensors 41. A combination of hoppers to discharge the objects to be weighed therefrom is selected from the plurality of weighing hoppers 4 by combination calculation by the control unit 20, and the objects to be weighed are discharged into the collecting chute 6 from the weighing hoppers 4 corresponding to the combination. The collecting chute 6 is provided below the weighing hoppers 4. The objects to be weighed discharged from the weighing hoppers 4 slide down on the collecting chute 6, and is sent out from an outlet provided in a lower portion thereof to the packaging machine (vertical pillow packaging machine) shown in FIG. 13.

In the packaging machine, bags are produced and simultaneously the objects to be weighed discharged from the combination weigher are charged into the bags and packaged. In this packaging machine, a sheet of wrapping material 50 withdrawn from a roll of a wrapping material is caused to surround a tube 51 by a former 52 to form cylindrical shape, is suctioned by a pulldown belt 53 to be transferred downwardly, and the superposed vertical edges of the cylindrically formed wrapping material 50 are sealed (by fusion adhesion) by a vertical sealing machine 54. The weighed objects to be weighed are then charged into the cylindrical wrapping material 50 through the tube 51, and a horizontal sealing machine 55 disposed below the tube 51 seals horizontally across the upper end of a preceding bag and the lower end of the following bag in the transverse direction (by fusion adhesion). By this horizontal sealing, the preceding bag is completed with its upper and lower ends sealed since the lower end of the preceding bag is sealed by the previous horizontal sealing. The center of the horizontal sealed portion is then cut by a cutter built in the horizontal sealing machine 55 so that the preceding bag and the following bag are separated.

Patent document 1: Japanese Unexamined Patent Publication No. S60-161530
Patent document 2: Japanese Examined Patent Publication H8-1395

DISCLOSURE OF THE INVENTION

Problems to be Solved by the Invention

In such a conventional combination weigher, in order to be adapted to a high-speed packaging machine, the discharge time interval (interval of the timing of the start of discharging) needs to be shortened. Heretofore, the number of the weighing hoppers is therefore increased to a certain number to constitute so-called double shift or triple shift rather than single shift. By doing so, the discharge time interval is shortened to ½ or ⅓ of single shift to be adapted to such a packaging machine. Although this constitution enables shortening of the discharge time interval, it does not shorten the length from the upper end to the lower end of the batch of the objects to be weighed discharged from the collecting chute 6, nor shorten the time taken to accommodate all of the objects to be weighed discharged from the combination weigher into a bag (a bag of the packaging machine). In the high-speed packaging machine the cycle time from one sealing by the horizontal sealing machine 55 to another is short. For this reason, if horizontal sealing is carried out before all of the objects to be weighed discharged from the combination weigher is accommodated into the bag, the objects to be weighed are disadvantageously stuck in the sealed portion.

The present invention has been made to solve the problems mentioned above, and its object is to provide a combination weigher which can prevent the objects to be weighed from being stuck inside the packaging machine and can be adapted to a high-speed packaging machine.

Means for Solving the Problems

To achieve the above-mentioned objects, the combination weigher of the present invention is so configured as to comprise N (N is a plural number) groups of combination hoppers which are N hopper lines of arcuate sections composing a line of combination hoppers including a plurality of circularly arranged combination hoppers for receiving objects to be weighed; N collecting chutes disposed below the groups of combination hoppers to respectively correspond to the groups of combination hoppers for collecting the objects to be weighed discharged from the combination hoppers of the corresponding groups of combination hoppers and discharging the same from an outlet provided in a tower portion thereof; N collecting hoppers provided at the outlets of the collecting chutes to respectively correspond to the groups of combination hoppers and the collecting chutes, for temporarily retaining the objects to be weighed discharged from the outlets of the collecting chutes, and then discharging the objects to be weighed into an inlet of the packaging machine; and a control means for repeatedly carrying out, with respect to the groups of combination hoppers and the corresponding collecting hoppers, a series of processes including a combination process for performing a combination calculation on a basis of the weight of the objects to be weighed fed into each combination hopper of the groups of combination hoppers and determining a single combination of the combination hoppers which causes the total weight of the fed objects to be weighed falls within a predetermined weight range, a discharge preparation process for discharging the objects to be weighed from the combination hoppers forming the combination determined by the combination process, and a discharge process for discharging from the collecting hoppers the objects to be weighed, discharged from the combination hoppers and retained in the collecting hoppers, the control means carrying out the combination process and the discharge preparation process with respect to each of the groups of combination hoppers sequentially with a time difference 1/N of one operation cycle time, and carrying out the discharge process with respect to each of the collecting hoppers sequentially with a time difference of 1/N of the one operation cycle time, the one operation cycle time being the time taken from the start of discharging of the objects to be weighed from the combination hoppers forming the combination determined by the combination process, followed by feeding of tie objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process (this is referred to as a first constitution).

According to this constitution, a plurality of the groups of combination hoppers, the corresponding collecting chutes and the corresponding collecting hoppers are provided, and each operates as a combination weigher and sequentially discharges the objects to be weighed from the collecting hoppers to the packaging machine. Therefore, the time interval for discharging from each collecting hopper can be shortened, and the combination weigher can be adapted to a high-speed packaging machine. In addition, the objects to be weighed discharged from the combination hoppers of each group of combination hoppers are temporarily accumulated in each collecting hopper after passing through each collecting chute, and the objects to be weighed is discharged from the collecting hopper in a state that the objects to be weighed gather together well. Hence, the batch length of the objects to be weighed discharged from each collecting hopper is shortened and a single discharge time is shortened, and the objects to be weighed can be prevented from getting stuck inside the packaging machine.

Another possible constitution is such that the number of the groups of combination hoppers, the collecting chutes and the collecting hoppers (these are collectively referred to as a measuring section) is two (N=2). Thus, by providing a constitution in which two measuring sections are provided and each measuring section is caused to perform a so-called single shift operation, in contrast to a constitution of a double shift operation, the one entire operation cycle time can be used as the time taken for allowing the objects to be weighed discharged from the combination hoppers to gather together as a chunk in each measuring section and discharging the objects into the collecting hoppers. Therefore, there is time sufficient to allow the objects to be weighed to gather together and to discharge the same, regardless of the type of the objects to be weighed, and the combination weigher can be adapted to packaging machines operated at a high speed for almost every kind of objects to be weighed. Moreover, the constitution made to perform a single shift operation can obtain a similar weighing accuracy with a more compact constitution in contrast to the constitution made to perform a double shift operation. Therefore, the weigher can be adapted to a packaging machine operated at a high speed with a more compact constitution and a reduced size regardless of the type of the objects to be weighed as described above.

The control means preferably has a constitution in which the control means performs the discharge process according to a preset order of the collecting hoppers for carrying out the discharge process, and in carrying out the discharge process with respect to an arbitrary collecting hoppers, when the discharge preparation process has not been carried out with respect to the groups of combination hoppers corresponding to the arbitrary collecting hoppers prior to carrying out the discharge process, does not perform the discharge process with respect to the arbitrary collecting hoppers once, and then carries out the discharge process with respect to the next collecting hoppers to be processed subsequently to the arbitrary collecting hoppers, skipping the arbitrary collecting hoppers. When there is no combination that falls within the predetermined weight range in a certain group of combination hoppers (in case of combination failure), the discharge preparation process is not carried out with respect to the group of combination hoppers (the objects to be weighed are not fed to the collecting hoppers), the combination process is carried out again after additional feeding or the like of the objects to be weighed. Therefore, if an attempt is made to precisely keep the predetermined discharging order of the collecting hoppers, the packaging machine enters a standby state during the above mentioned one operation cycle time, thereby N times (operations for N package bags) of packaging operations are not performed. Thus, in such a case, as mentioned above, this collecting hopper is skipped and a discharge process is carried out with respect to the next collecting hopper. As a result, only one omission of the packaging operation performed by the packaging machine is satisfactory, and a decrease in the rate at which the packaging machine is working can be minimized.

Alternatively, the control means preferably has a constitution in which the control means sequentially selects from all of the collecting hoppers corresponding to the groups of combination hoppers with respect to which the discharge preparation process is carried out, and performs the discharge process with respect to the selected collecting hoppers. In this case, the discharging order of the collecting hoppers is not predetermined, the collecting hoppers, corresponding to the groups of combination hoppers with respect to which the discharge preparation process has been carried out, are sequentially selected and discharged. Hence, when there is no combination that falls within the predetermined weight range in a certain group of combination hoppers, as described above, only one omission of the packaging operation performed by the packaging machine is satisfactory, and a decrease in the rate at which the packaging machine is working can be minimized.

As already stated, in a case where the objects to be weighed cannot be successively discharged from the collecting hoppers of the same group of combination hoppers due to the occurrence of a series of combination failures or other problems in this group of combination hoppers, under the condition in which the discharging order of the collecting hoppers is predetermined and the turn of the collecting hopper is skipped if the discharge preparation process is not carried out due to a combination failure or the like in a certain group of combination hoppers, or under the condition in which the discharging order of the collecting hoppers is not predetermined and discharging is executed according to the order of the collecting hoppers corresponding to the groups of combination hoppers with respect to which a discharge preparation process has been carried out, the packaging machine does not perform an operation once in every twice in a combination weigher comprising two groups of combination hoppers and collecting hoppers. In a combination weigher comprising three groups of combination hoppers and collecting hoppers, the packaging machine does not perform an operation once in every three times, and in a combination weigher comprising four groups of combination hoppers and collecting hoppers, the packaging machine does not perform an operation once in every four times. Accordingly, a constitution in which the number of the groups of combination hoppers, the collecting chutes and the collecting hoppers is three or more (N≧3) is preferred.

To adapt the combination weigher to the packaging machine which is operated at a speed that requires that the next discharge preparation process is started before the discharge process is started with respect to the corresponding groups of combination hoppers and the corresponding collecting hoppers if the number of the groups of combination hoppers, the collecting chutes and the collecting hoppers is two, the combination weigher is preferably constituted so that the number of the groups of combination hoppers, the collecting chutes and the collecting hoppers is three or more (N≧3). Because of this constitution, the combination weigher is configured so that, in a group of combination hoppers and a collecting hopper, the next discharge preparation process with respect to the group of combination hoppers is not started at a tine of starting the discharge process with respect to the collecting hoppers, and when the packaging machine is stopped, accumulation of two discharge batches of the objects to be weighed in the collecting hoppers can be prevented, thereby enabling it to make the packaging machine produce its maximum ability (maximum speed).

The collecting chutes are preferably so constituted that the time taken for all of the objects to be weighed discharged to pass through the collecting chutes and be fed into the collecting hoppers from the start of discharging of the objects to be weighed from the combination hoppers forming the combination determined by the combination process (hereinafter referred to as the transport time) falls within the range of 0.9 time to 1.1 times as long as the one operation cycle time. Thus, in order to prolong the transport time to be substantially equal to one operation cycle time, the combination weigher may be constituted so that the inclination of the slope of the collecting chute over which the objects to be weighed slide down is decreased. The height of the collecting chute can be reduced by decreasing the inclination of the collecting chute in such a manner, whereby the height of the entire combination weigher can be also reduced. Moreover, decreasing the inclination of the collecting chutes can make the objects to be weighed slide down on the collecting chute more slowly. It can reduce the impact of collision between the objects to be weighed when they slide down on the collecting chute and the impact of collision between the objects to be weighed or the impact of collision between the objects to be weighed and the collecting hoppers when the objects to be weighed are fed into the collecting chute. This effectively prevents the objects to be weighed from being damaged.

The combination weigher of the present invention comprises N (N is a plural number) groups of combination hoppers which are N hopper lines of arcuate sections composing a line of combination hoppers including a plurality of circularly arranged combination hoppers for receiving objects to be weighed; N collecting chutes disposed below the groups of combination hoppers to respectively correspond to the groups of combination hoppers, for collecting the objects to be weighed discharged from the combination hoppers of the corresponding groups of combination hoppers and discharging the same from an outlet provided in a lower portion thereof; N collecting hoppers provided at the outlets of the collecting chutes to respectively correspond to the groups of combination hoppers and the collecting chutes, for temporarily retaining the objects to be weighed discharged from the outlets of the collecting chutes, and then discharging the objects to be weighed into an inlet of the packaging machine; and a control means for repeatedly carrying out, with respect to each weighing unit including the groups of combination hoppers and the corresponding collecting hoppers, a series of processes including a combination process for performing a combination calculation on a basis of the weight of the objects to be weighed in an arbitrary number of combination hoppers of all the combination hoppers constituting the groups of combination hoppers and determining a single combination of the combination hoppers which causes the total weight of the fed objects to be weighed fall within a predetermined weight range, a discharge preparation process for discharging the objects to be weighed from the combination hoppers forming the combination determined by the combination process, and a discharge process for discharging from the collecting hoppers the objects to be weighed, discharged from the combination hoppers and retained in the collecting hoppers, the control means carrying out the series of processes with respect to each weighing unit once in every 1/k (k is an integer of 2 or more) of one operation cycle time, and carrying out the series of processes with a time difference of 1/(k×N) of the one operation cycle time according to a series of the weighing units, the one operation cycle time being the time taken from the start of discharging of the objects to be weighed from the combination hoppers forming the combination determined by the combination process, followed by feeding of the objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process (this is referred to as the second constitution).

According to this constitution, a plurality of the groups of combination hoppers, the corresponding collecting chutes and the corresponding collecting hoppers are provided, and each operates as a combination weigher and sequentially discharges the objects to be weighed from the collecting hoppers to the packaging machine. Therefore, the time interval for discharging from each collecting hopper can be shortened, and the combination weigher can be adapted to a high-speed packaging machine. In addition, the objects to be weighed discharged from the combination hoppers of each group of combination hoppers are temporarily accumulated in each collecting hopper after passing through each collecting chute, and the objects to be weighed are discharged from the collecting hopper in a state that the objects to be weighed gather together well. Hence, the batch length of the objects to be weighed discharged from each collecting hopper is shortened and a single discharge time is shortened, and the objects to be weighed can be prevented from getting stuck inside the packaging machine. Moreover, the series of processes is carried out with respect to each weighing unit once in every 1/k time of one operation cycle time, and the series of processes is carried out with a time difference of 1/(k×N) time of one operation cycle time among the weighing units, whereby the interval of the discharge time for the objects to be weighed fed to the packaging machine can be further shortened and the combination weigher can be adapted to packaging machines operated at a high speed.

The control means preferably has a constitution in which the control means performs the discharge process according to a preset order of the collecting hoppers for carrying out the discharge process, and in carrying out the discharge process with respect to an arbitrary collecting hoppers, when the discharge preparation process has not been carried out with respect to the groups of combination hoppers corresponding to the arbitrary collecting hoppers prior to carrying out the discharge process, does not perform the discharge process with respect to the arbitrary collecting hoppers once, and then carries out the discharge process with respect to the next collecting hoppers to be processed subsequently to the arbitrary collecting hoppers, skipping the arbitrary collecting hoppers. When there is no combination that falls within the predetermined weight range in a certain group of combination hoppers, the discharge preparation process is not carried out with respect to the group of combination hoppers (the objects to be weighed are not fed to the collecting hoppers), the combination process is carried out again after additional feeding or the like of the objects to be weighed. Therefore, if an attempt is made to precisely keep the predetermined discharging order of the collecting hoppers, the packaging machine enters a standby state during the above mentioned one operation cycle time, thereby N times (operations for N package bags) of packaging operations are not performed. Thus, in such a case, as mentioned above, this collecting hopper is skipped and a discharge process is carried out with respect to the next collecting hopper. As a result, only one omission of the packaging operation performed by the packaging machine is satisfactory, and a decrease in the rate at which the packaging machine is working can be minimized.

Alternatively, the control means preferably has a constitution in which the control means sequentially selects from all of the collecting hoppers corresponding to the groups of combination hoppers with respect to which the discharge preparation process is carried out, and performs the discharge process with respect to the selected collecting hoppers. In this case, the discharging order of the collecting hoppers is not predetermined, the collecting hoppers corresponding to the groups of combination hoppers with respect to which the discharge preparation process has been carried out are sequentially selected and discharged. Hence, when there is no combination that falls within the predetermined weight range in a certain group of combination hoppers, as described above, only one omission of the packaging operation performed by the packaging machine is satisfactory, and a decrease in the rate at which the packaging machine is working can be minimized.

The collecting chutes are preferably so constituted that the time taken for all of the objects to be weighed discharged to pass through the collecting chutes and be fed into the collecting hoppers from the start of discharging of the objects to be weighed from the combination hoppers forming the combination determined by the combination process (hereinafter referred to as transport time) falls within the range of 0.9 time to 1.1 times as long as 1/k of the one operation cycle time. Thus, in order to prolong the transport time to be substantially equal to one operation cycle time, the combination weigher may be constituted so that the inclination of the slope of the collecting chute over which the objects to be weighed slide down is decreased. The height of the collecting chute can be reduced by decreasing the inclination of the collecting chute in such a manner, whereby the height of the entire combination weigher can be also reduced. Moreover, decreasing the inclination of the collecting chutes can make the objects to be weighed slide down on the collecting chute more slowly. It can also reduce the impact of collision between the objects to be weighed when they slide down on the collecting chute and the impact of collision between the objects to be weighed or the impact of collision between the objects to be weighed and the collecting hoppers when the objects to be weighed are fed into the collecting chute. This effectively prevents the objects to be weighed from being damaged.

The first constitution described above is a case where (the weight of the objects to be weighed fed into an arbitrary number of combination hoppers) used in the combination calculation carried out for each of the groups of combination hoppers in the second constitution is replaced to (the weight of the objects to be weighed fed into all the combination hoppers constituting the group of combination hoppers), and where the above mentioned k is 1.

If one operation cycle time is made equal to one weighing cycle time, the discharge preparation process can be advantageously carried out immediately after the combination process is finished with no waiting time. Herein, one weighing cycle time is the time taken from the start of discharging of the objects to be weighed from the combination hoppers forming the combination determined by the combination process, then after the objects to be weighed are fed into the combination hoppers forming the combination to the completion of the next combination process carried out by using at least the weight of the objects to be weighed fed into the combination hoppers forming the previous combination.

A constitution in which the combination hoppers are weighing hoppers which weigh the weight of the fed objects to be weighed is also possible.

Another possible constitution is such that two lines of combination hoppers are arranged in a vertical order, the combination hoppers of the upper line are weighing hoppers for weighing the weight of the fed objects to be weighed, the combination hoppers of the lower line are memory hoppers which are provided to respectively correspond to the weighing hoppers, the objects weighed by the weighing hoppers being fed into the memory hoppers, and the weighing hoppers are configured to discharge the objects to be weighed selectively to the corresponding memory hoppers and the corresponding collecting chute.

Another possible constitution is such that a plurality of weighing hoppers for weighing the weight of the fed objects to be weighed are provided above the combination hoppers correspondingly to the combination hoppers, respectively; the combination hoppers are memory hoppers each comprising two containing chambers into which the objects weighed by the weighing hoppers is separately fed, the memory hoppers being capable of independently discharging the objects to be weighed fed into each of the containing chambers thereof; the weighing hoppers are constituted in such a manner that the objects to be weighed can be selectively discharged into the two containing chambers of the corresponding memory hoppers; and the control means performing a combination calculation performed for each of the groups of combination hoppers on a basis of the weight of the objects to be weighed fed into the containing chambers of the memory hoppers, determining a combination of the containing chambers of the memory hoppers whose total weight of the fed objects to be weighed falls within a predetermined weight range, and discharging the objects to be weighed from the containing chambers forming the determined combination.

The combination hoppers may be weighing hoppers each comprising two weighing chambers, and each of the weighing hoppers is capable of weighing the weight of the objects to be weighed fed into each of the weighing chambers and independently discharging the objects to be weighed fed into each of the weighing chambers, the control means performing a combination calculation performed for each of the groups of combination hoppers on a basis of the weight of the objects to be weighed fed into the weighing chambers of the weighing hoppers, determining a combination of the weighing chambers of the weighing hoppers whose total weight of the fed objects to be weighed falls within a predetermined weight range, and discharging the objects to be weighed from the weighing chambers forming the determined combination.

Another possible constitution is such that a plurality of weighing hoppers are provided above the combination hoppers corresponding to the combination hoppers, respectively, the weighing hoppers each comprising two weighing chambers, and each of the weighing hoppers is capable of weighing the weight of the objects to be weighed fed into each of the weighing chambers and independently discharging the objects to be weighed fed into each of the weighing chambers, the combination hoppers are memory hoppers each comprising two containing chambers corresponding to the weighing chambers of the corresponding weighing hoppers, respectively, the objects to be weighed being separately fed into the containing chambers from the corresponding weighing chambers of the corresponding weighing hoppers, the memory hoppers being capable of independently discharging the objects to be weighed fed into each of the containing chambers thereof, the control means performing a combination calculation performed for each of the groups of combination hoppers on a basis of the weight of the objects to be weighed fed into the containing chambers of the memory hoppers, determining a combination of the containing chambers of the memory hoppers whose total weight of the fed objects to be weighed falls within a predetermined weight range, and discharging the objects to be weighed from the containing chambers forming the determined combination.

Effect of the Invention

The present invention has the constitution described above, and can advantageously provide a combination weigher which can be adapted to a high-speed packaging machine without causing the objects to be weighed being stuck in the packaging machine.

The objects, features and advantages of the present invention are clarified with reference to accompanying drawings from the detailed description of the preferable embodiments below.

BRIEF DESCRIPTION OF DRAWINGS

FIG. 1(a) is a schematic diagram of a cross section seen from laterally of a combination weigher of an embodiment of the present invention, while FIG. 1(b) is a schematic diagram of collecting chutes and collecting hoppers of a combination weigher of an embodiment of the present invention seen from above.

FIG. 3(a) is a timing chart of a single shift operation in a combination weigher of an embodiment of the present invention, while FIG. 3(b) is a timing chart showing the opening and closing operation of the gates of the weighing hoppers and collecting hoppers in one combination weigher unit of combination weigher units A-D) and the time when the objects to be weighed slide down on the collecting chute to be fed to the collecting hoppers.

FIG. 5(a) is a schematic diagram of another example of collecting chute and collecting hoppers in a combination weigher of an embodiment of the present invention seen from laterally. while FIG. 5(b) is a schematic diagram of the collecting chute and collecting hoppers of the example seen from above.

DESCRIPTION OF THE NUMERALS

Figure 1:
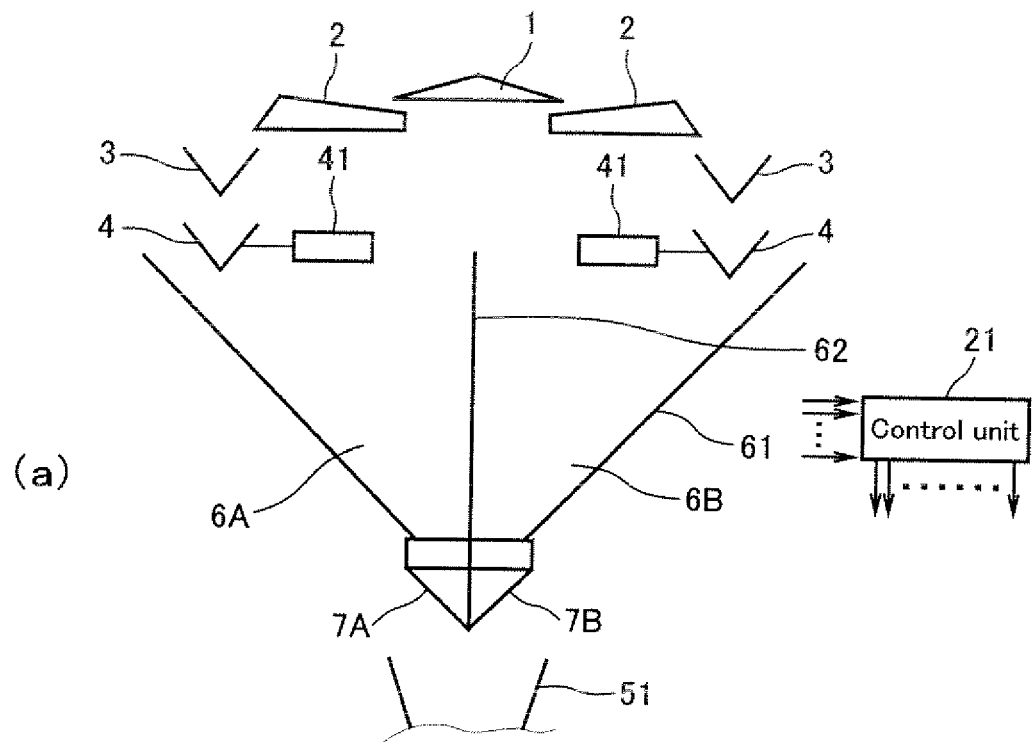
Figure 1:
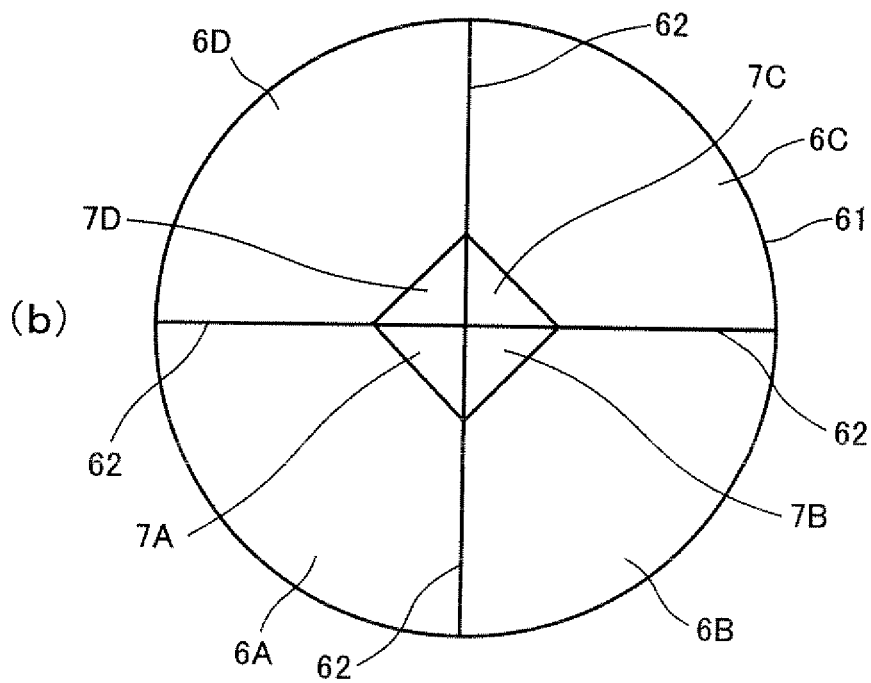

1 Dispersion feeder
2 Linear feeder
3 Feeding hopper
4 Weighing hopper
5 Memory hopper
6A-6D Collecting chutes
7A-7D Collecting hoppers
7a-7d Collecting hoppers
21 Control unit

BEST MODE FOR CARRYING OUT THE INVENTION

Preferred embodiments of the present invention will be described below with reference to the drawings.

EMBODIMENTS

FIG. 1(a) is a schematic diagram of a cross section seen from laterally of a combination weigher of an embodiment of the present invention, while FIG. 1(b) is a schematic diagram of collecting chutes and collecting hoppers of a combination weigher of an embodiment of the present invention seen from above.

Figure 2:
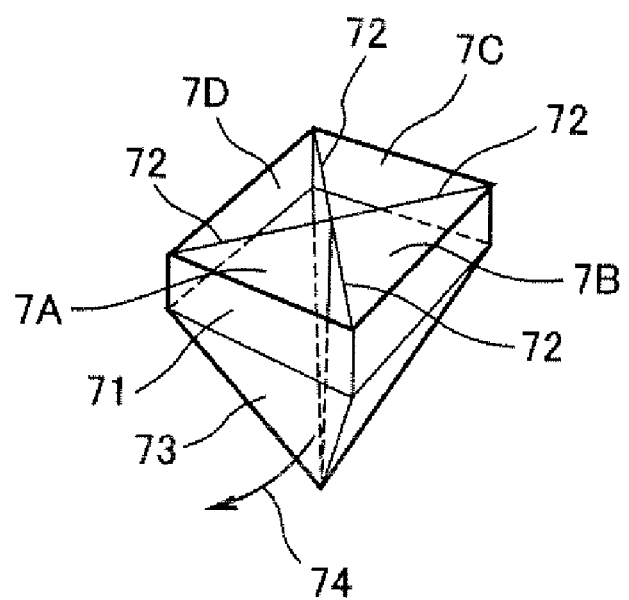
FIG. 2 is a simplified perspective view of the collecting hoppers shown in FIG. 1.

The combination weigher of this embodiment is provided with a dispersion feeder 1 at the center of an upper part of the apparatus, the dispersion feeder 1 having conical shape and radially dispersing objects to be weighed supplied from an external feeding device by vibration. Linear feeders 2 are provided around the dispersion feeder 1, the linear feeders 2 transferring the objects to be weighed sent from the dispersion feeder 1 into each of feeding hoppers 3 by vibration. A plurality of the feeding hoppers 3 and weighing hoppers 4 are disposed below the linear feeders 2 and are arranged circularly in such a manner that each feeding hopper 3 and each weighing hopper 4 correspond to the associated one of the linear feeder 2. The feeding hoppers 3 receive the objects to be weighed transferred from the linear feeders 2, and gates (not shown) are opened when the weighing hoppers 4 disposed below the feeding hoppers become empty to feed the objects to be weighed to the weighing hoppers 4. Weight sensors 41 such as load cells are attached to the weighing hoppers 4, and the weight of the objects to be weighed inside the weighing hoppers 4 is measured by these weight sensors 41. The constitution described above is the same as that of the prior art example shown in FIG. 12. In this embodiment, collecting chutes 6A-6D which are four separate elements are provided below the weighing hoppers 4, and collecting hoppers 7A-7D are provided at the outlets of the collecting chutes 6A-6D, respectively. A chute 61 having a substantially inverted conical shape is partitioned into four chutes by partition walls 62, forming the collecting chutes 6A-6D. Moreover, these four collecting chutes 6A-6D are positioned in correspondence with ¼ in number of all the weighing hoppers 4 to receive the objects to be weighed discharged from ¼ in number of the weighing hoppers 4 of all the circularly disposed weighing hoppers 4. The objects to be weighed discharged from the weighing hoppers 4 slide down on the collecting chutes 6A-6D corresponding to the weighing hoppers 4 to be temporarily accumulated in the collecting hoppers 7A-7D. A simplified perspective view of the collecting hoppers 7A-7D is shown in FIG. 2. Each of the collecting hoppers 7A-7D constitutes a portion for containing the objects to be weighed by a side plate 71, two partition plates 72 and a gate 73. Each of the partition plates 72 is shared by adjacent collecting hoppers, and four collecting hoppers 7A-7D are integrally formed. The objects to be weighed in each of the collecting hoppers 7A-7D are discharged by opening the gate 73 outwardly (for example, the direction in which the gate 73 of the collecting hopper 7A is opened is shown by an arrow 74). A control unit 21 controls the operation of the entire combination weigher and also carries out combination calculation. For example, a packaging machine (vertical pillow packaging machine) shown in FIG. 13 is placed below this combination weigher, and the objects to be weighed discharged from each of the collecting hoppers 7A-7D are fed into an inlet which is a widened upper part of a cylindrical tube 51 of the packaging machine.

The operation of the combination weigher of this embodiment will be described now. In this embodiment, four collecting chutes 6A-6D are provided, and each set of a linear feeder 2, feeding hoppers 3, weighing hoppers 4 and a collecting hopper (7A-7D) respectively provided in correspondence with each of the collecting chutes, operates as a single combination weigher. The collecting chute 6A and the corresponding portions which operate as a single combination weigher are referred to as a combination weigher unit A. Similarly, the collecting chute 6B and the corresponding portions are referred to as a combination weigher unit B; the collecting chute 6C and the corresponding portions are referred to as a combination weigher unit C; and the collecting chute 6D and the corresponding portions are referred to as a combination weigher unit D in the description below. Each of the combination weigher units A, B, C and D has the same number of the weighing hoppers 4.

The control unit 21 carries out combination calculation on a basis of a weighed value obtained by a weight sensor 41 for each of the combination weigher units A, B, C and D, and determines a combination of hoppers for discharge (hereinafter referred to discharge hopper) from a plurality of weighing hoppers 4 in each combination weigher unit. For example, when ten weighing hoppers 4 are provided in correspondence with each of the collecting chutes 6A-6D and four hoppers are selected as the discharge hoppers, a combination of four hoppers selected from ten weighing hoppers 4 such that the total weight of the objects to be weight therein falls within a permissible range (predetermined weight range) relative to the target weight that is determined by the combination calculation. When there are more than one combination that fall within the permissible range relative to the target weight, for example, the combination which has the weight closest to the target weight (combination which has the exact target weight, if any) is selected. The objects to be weighed are discharged into the collecting chutes and are accumulated in the collecting hoppers by opening and closing the gates (not shown) of the weighing hoppers 4 corresponding to the determined combination. Moreover, the control unit 21 opens the gate of one of the collecting hoppers 7A-7D in response to a feed command signal from the packaging machine, and the objects to be weighed are fed from the collecting hopper whose gate is opened into the cylindrical tube 51 of the packaging machine.

Figure 3:
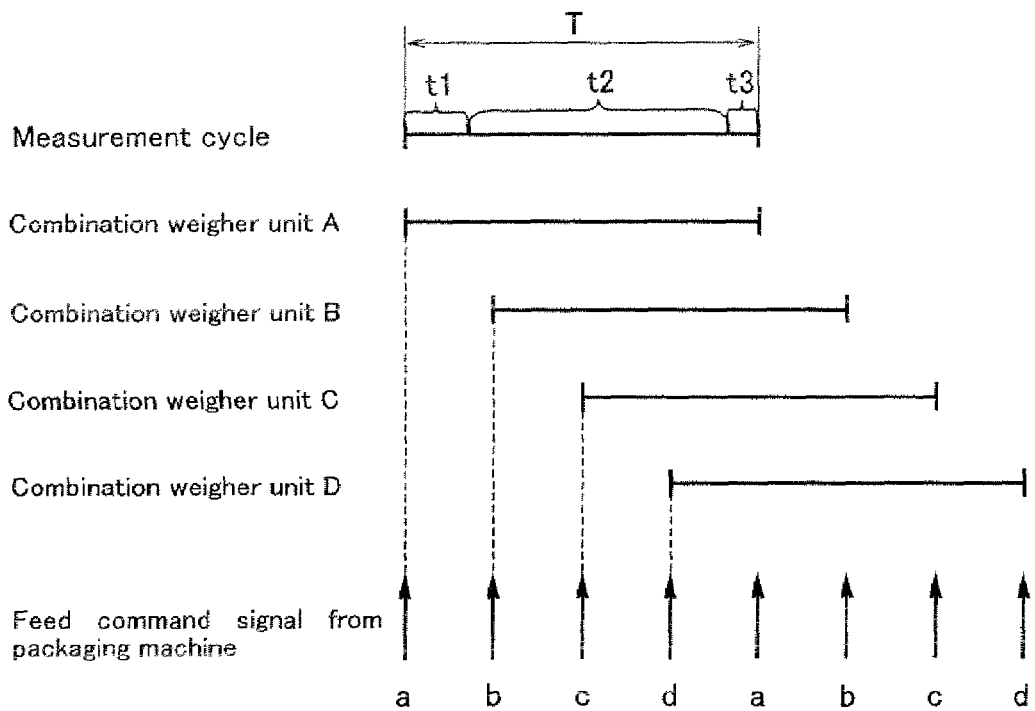
Figure 3:
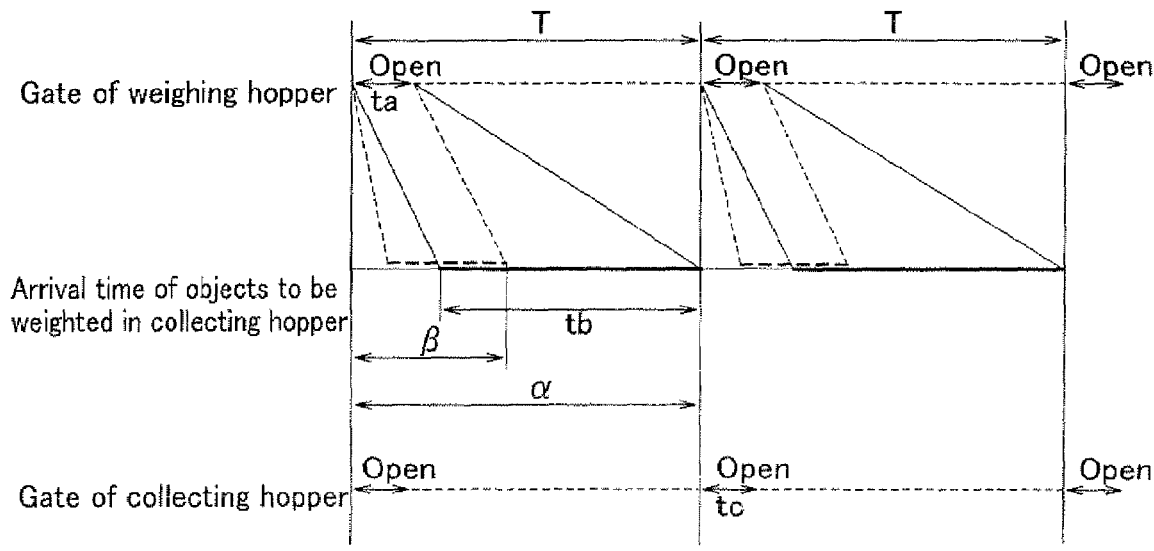

FIG. 3(*a*) is a timing chart of operation in each of the combination weigher units A-D. In this FIG. 3*a*), the timing of only a single weighing cycle in each of the combination weigher units A-D is shown, but this weighing cycle is repeated in succession in each of the combination weigher units A-D.

One weighing cycle (T) of each of the combination weigher units A-D consists of a discharge time t1, a stabilization time t2 and a combination time t3. The discharge time t1 is a time taken to open and close the gates of the discharge hoppers which are operated to feed the objects to be weighed to the collecting hoppers and to open and close the gates of the feeding hoppers which are operated to feed the objects to be weighed to the discharge hoppers. The stabilization time t2 is a stabilization time of the weight sensor 41 attached to the discharge hoppers. The combination time t3 is a time taken to perform combination calculation and a process for determining the next combination of the discharge hoppers. In this examples of FIG. 3(*a*), a period for discharging the objects to be weighed to the packaging machine by opening and closing the gates of the collecting hoppers in response to a feed command signal from the packaging machine is within the discharge time t1. Controlling the timing of opening and closing the gates of the collecting hoppers, weighing hoppers (discharge hoppers) and feeding hoppers by the control unit 21 may be so adapted that, for example, the timing of opening and closing the gates of the collecting hoppers is controlled on a basis of a feed command signal from the packaging machine and the timing of opening and closing the gates of the weighing hoppers and feeding hoppers is controlled on a basis of the timing of opening and closing the gates of the collecting hoppers. This allows the timings of opening and closing the gates of the collecting hoppers, weighing hoppers and feeding hoppers to be different. The time T of one weighing cycle is a time which can be determined uniquely depending on the properties of the objects to be weighed or the like.

In the case of FIG. 3(*a*), discharging of the objects to be weighed from the combination weigher unit A to the packaging machine is carried out based on a feed command signal indicating the timing a output from the packaging machine; discharging from the combination weigher unit B to the packaging machine is carried out based on a feed command signal of the timing b; discharging from the combination weigher unit C to the packaging machine is carried out based on a feed command signal of the timing c; and discharging from the combination weigher unit D to the packaging machine is carried out based on a feed command signal of the timing d. In such a manner, by operating each of the combination weigher units A-D with a time difference of T/4 time in a preset order, the discharges can be performed four times faster than in a case where the entire device operates as a single combination weigher thereby allowing the combination weigher to be adapted to a packaging machine operated at a high speed. Moreover, the collecting chutes 6A-6D and collecting hoppers 7A-7D are respectively provided in correspondence with each of combination weigher units, and the objects to be weighed discharged from the weighing hoppers 4 of the combination weigher units are temporarily accumulated in the corresponding collecting hoppers 7A-7D through the corresponding collecting chutes 6A-6D and are discharged from the collecting hoppers 7A-7D in a state of gathering together satisfactory. Therefore, the batch length of the objects to be weighed discharged from each of the collecting hoppers 7A-7D is shortened and the period of a single discharge time is shortened, and the objects to be weighed can be also prevented from being stuck inside the packaging machine.

FIG. 3(*b*) is a timing chart showing the time taken for an operation for opening and closing in gates of the weighing hoppers and the collecting hoppers in a combination weigher unit of the combination weigher units A-D and the time taken for the objects to be weighed to slide down on the collecting chute and be fed into the collecting hoppers.

Figure 9:
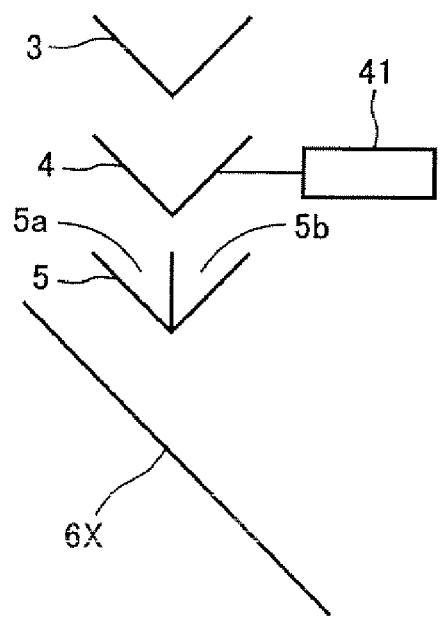
FIG. 9 is a schematic diagram showing another example of hoppers for use in a combination weigher of an embodiment of the present invention.
Figure 11:
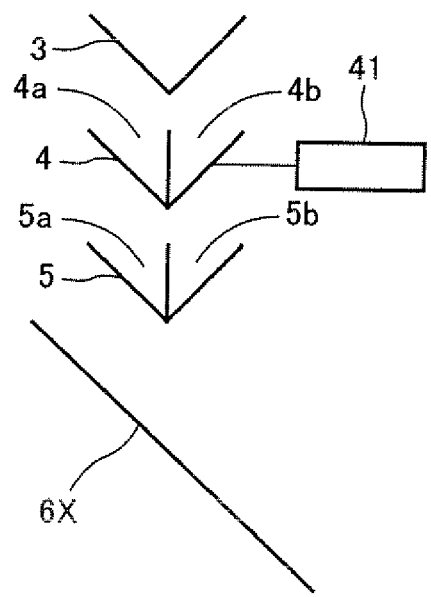
FIG. 11 is a schematic diagram showing another example of hoppers for use in a combination weigher of an embodiment of the present invention.

As shown in FIG. 3(*b*), when the gates of the weighing hoppers 4 is opened during a period ta (the period from when the gates of the weighing hoppers 4 start to open, and then keep an opened state, until they are closed), the objects to be weighed discharged from the weighing hoppers 4 are fed to the collecting hoppers during a period tb. In a period tc immediately after the time α (hereinafter referred to as transport time) that elapses from when the gates of the weighing hoppers 4 starts to open until the last object to be weighed which reaches the collecting hopper is fed to the collecting hoppers, the gates of the collecting hoppers are opened in response to a feed command signal from the packaging machine and the objects to be weighed are discharged. In this Example, the collecting chutes are so constituted that the transport time α becomes equal to the time T of one weighing cycle. That is, when the inclination of the chute surfaces of the collecting chutes is large, as shown by the broken line in FIG. 3(*b*), the objects to be weighed quickly reach the collecting hoppers and the transport time becomes β, but the transport time α can be extended to be equal to the time T of one weighing cycle by reducing the inclination of the chute surfaces of the collecting chutes. The height of the collecting chutes can be reduced by reducing the inclination of the collecting chutes in such a manner, whereby the height of the entire combination weigher can be also advantageously reduced. In particular, as in this embodiment, when the total number of the weighing hoppers 4 is increased, the outer periphery of the collecting chutes 6A-6D (outer periphery of the chute 61 having a substantially inverted conical shape) is enlarged, and its height is increased, by providing a plurality of combination weigher units A-D, an increase in the height of the collecting chutes 6A-6D can be prevented by reducing the inclination of the collecting chutes 6A-6D. This also provides an advantage of keeping the height of the entire combination weigher low. Moreover, even when the height of the entire combination weigher is increased in the constitution in which the memory hoppers 5 are provided below the weighing hoppers 4 as shown in FIGS. 9 and 11 as described later, the height of the collecting chutes 6A-6D can be reduced by decreasing the inclination of the collecting chutes, thereby preventing an increase in the height of the entire combination weigher. Moreover, decreasing the inclination of the collecting chutes can make the objects to be weighed slide down on the collecting chute more slowly. It can also reduce the impact of collision between the objects to be weighed when they slide down on the collecting chute and the impact of collision between the objects to be weighed or the impact of collision between the objects to be weighed and the collecting hoppers when the objects to be weighed are fed into the collecting chute. This effectively prevents the objects to be weighed from being damaged.

In this Example, although the transport time α is made equal to the time T of one weighing cycle, they may be slightly different. However, it is undesirable to set the transport time α too much longer than the time T of one weighing cycle. If so, two batches of the objects to be weighed, discharged from the weighing hoppers 4, are likely to coexist on the collecting chutes, thereby resulting in mixing of these objects. Moreover, whereas shortening the transport time does not increase the weighing capacity, the above advantage cannot be achieved if the transport time is shortened excessively. Therefore, it is empirically preferred that the transport time α ranges from 0.9 time to 1.1 times as long as the weighing cycle time T. Moreover, since a period tc for discharging the objects to be weighed from the collecting hoppers is set to be immediately after the lapse of the transport time α in this Example, the collecting chutes are constituted so that the time from the start of discharging of the objects to be weighed from the weighing hoppers 4 until the time immediately before the discharged objects to be weighed are fed to the collecting hoppers and starts to be discharged from the collecting hopper is set to the time equal to the transport time α (time ranging from 0.9 time to 1.1 times as long as the weighing cycle time), and feeding into the collecting hoppers of all the objects to be weighed discharged from the weighing hoppers 4 is completed immediately before discharging from the collecting hoppers is started. However, any other design is possible as long as the period tc during which the objects to be weighed are discharged from the collecting hoppers is set to be between immediately after the lapse of the transport time α and the time that the objects to be weighed discharged from the weighing hoppers 4 next reaches the collecting hoppers. Therefore, the period tc during which the objects to be weighed are discharged from the collecting hoppers may be different from the discharge time t1 in some cases.

In the above, the case where the operation of one weighing cycle (T) shown in FIG. 3(*a*) is repeated in succession in each of the combination weigher units A-D is described, but the operation of one weighing cycle (T) is not always repeated in succession. For example, in the combination weigher, the operation time of the linear feeders 2 may be a bottleneck in some cases. When one operation time (tf) of the linear feeders 2 for feeding the objects to be weighed to the feeding hoppers 3 is longer than the time T of one weighing cycle, the operation time tf of the linear feeders 2 becomes a bottleneck, generating a waiting time tw (=tf−T). In such a case, the operation time tf of the linear feeders 2 (=T+tw) can be set to one operation cycle time (Tm) so that the time T of one weighing cycle and waiting, time tw are repeated. In this case, each of the combination weigher units A-D can be operated with a time difference of Tm/4 time. Moreover, as for the aforementioned transport time α and the constitution of collecting chutes, the collecting chutes may be so constituted that the transport time α ranges from 0.9 time to 1.1 times as tong as one operation cycle time Tm (in case where the transport time α is not a bottleneck).

The objects to be weighed of some types may not slide down well on the collecting chutes, and therefore the aforementioned transport time (α1 herein) is longer than the time T of one weighing cycle, creating a bottleneck. In such a case, transport time α1 can be one operation cycle time (Tm), and each of the combination weigher units A-D can be operated with a time difference of Tm/4 time. That is, each of the combination weigher units A-D can be operated with a time difference of Tm/4 time by using the time which causes a bottleneck as one operation cycle time Tm. When there exists a time which causes a bottleneck, for example, an operation time (tg), which takes the next longest time to the bottleneck, can be used to calculate tg/4 time and each of the combination weigher units A-D can be operated with a time difference of (tg/4+x) time, in which x is an additional extra time. In this case, Tm=tg+4x. In FIG. 3(a) above, the case where the time T of one weighing cycle is equal to one operation cycle time Tm is shown.

Figure 4:
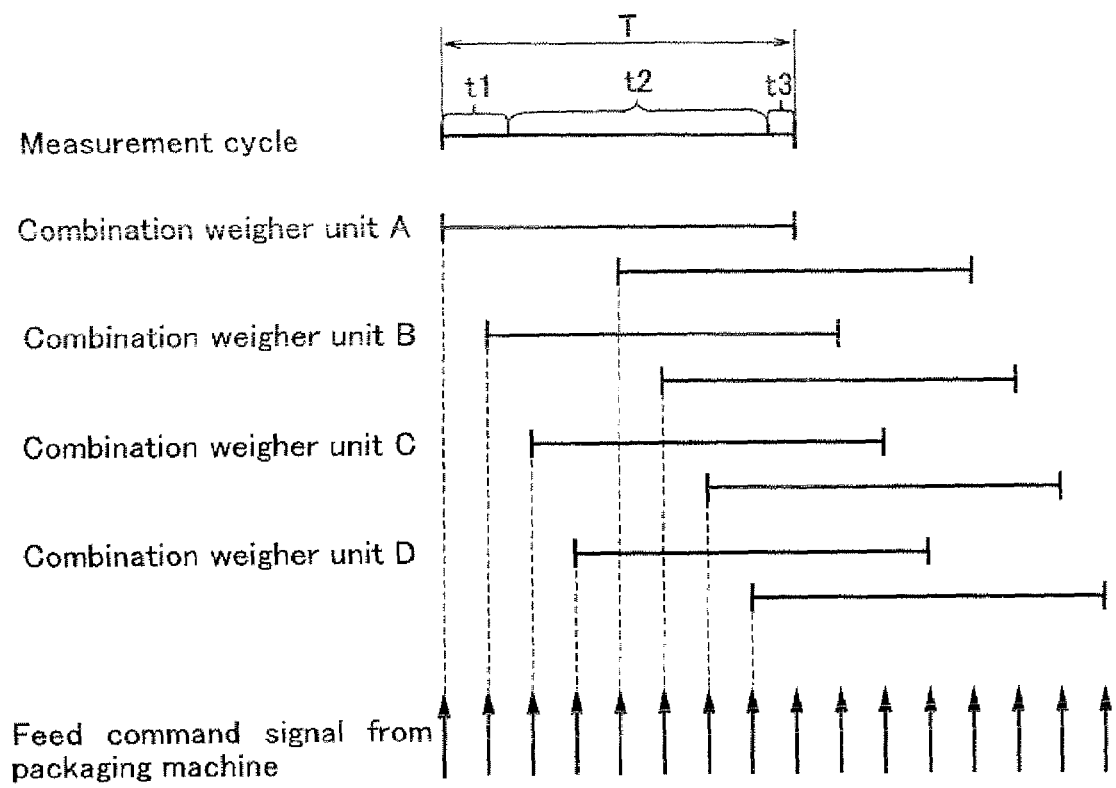
FIG. 4 is a timing chart of a double shift operation of a combination weigher of an embodiment of the present invention.

In the above, a case where a single shift operation is performed is described. A case where a double shift operation is performed will be now described. A timing chart for a case in which a double shift operation is performed is shown in FIG. 4. FIG. 4 is drawn in a manner similar to that of FIG. 3(a). In double shift operation, in order to obtain a weighing accuracy similar to that of single shift operation as shown in FIG. 3(a) described above in which the total number of the weighing hoppers 4 in each of the combination weigher units A-D is ten, and the number of the weighing hoppers selected by combination calculation is four, the total number of the weighing hoppers 4 in each of the combination weigher units A-D may be set to fourteen and the number of the weighing hoppers selected by combination calculation may be set to four. In case of the double shift operation in this combination weigher, operation is conducted so that discharging is carried out once in every T/2 time in each of the combination weigher units A-D (double shift operation) and each of the combination weigher units A-D is operated in a preset order with a tune difference of T/8 time, whereby discharging at a rate that is twice faster than in the case of the single shift opera ion shown in FIG. 3a) is achievable, allowing the combination weigher to be adapted to packaging machines operated at a high speeds.

In the double shift operation in each of the combination weigher units A-D as in a double shift operation in a normal combination weigher, discharging is carried out twice in one weighing cycle time T, by performing, in succession, one weighing cycle consisting of a first combination discharging operation for performing a combination calculation using an arbitrary number of weighed values of the weighed values of all hoppers participating in the combination (weighing hoppers 4 in this embodiment), thereby selecting such a combination of hoppers that the sum of weighed values falls within a predetermined weight range, and discharging the objects to be weighed in the hoppers forming the combination; and a second combination discharging operation for performing a combination calculation using an arbitrary number of weighed values of the weighed values of the hoppers which have not been selected in the first combination discharging operation and thereby selecting such a combination of hoppers that the sum of weighed values falls within a predetermined weight range and discharging the objects to be weighed in the hoppers forming the combination. In this embodiment, the objects to be weighed discharged from the weighing hoppers are temporarily accumulated in the collecting hopper. Therefore, discharging from the collecting hoppers is carried out in the next combination discharging operation.

Further, a triple shift operation can be also performed in a similar manner. In this case, in order to obtain a weighing accuracy similar to that of single shift operation as shown in FIG. 3(a) described above in which the total number of the weighing hoppers 4 in each of the combination weigher units A-D is ten, and the number of the weighing hoppers selected by combination calculation is four, the total number of the weighing hoppers 4 in each of the combination weigher units A-D may be set eighteen, and the number of the weighing hoppers 4 selected by combination calculation may be set to four. Operation is conducted so that discharging is carried out in each of the combination weigher units A-D once in every T/3 time (triple shift operation), and each of the combination weigher units A-D is operated in a preset order with a time difference of T/12 time, thereby discharging at a rate that is three times faster than in the case of the single shift operation shown in FIG. 3(a) is achievable, allowing the combination weigher to be adapted to packaging machines operated at higher speeds.

In the triple shift operation in each of the combination weigher units A-D, as in a triple shift operation in a normal combination weigher, discharging is carried out three times in one weighing cycle time T, by performing, in succession, one weighing cycle consisting of a first combination discharging operation for performing a combination calculation using an arbitrary number of weighed values of the weighed values of all hoppers participating in the combination (weighing hoppers 4 in this embodiment), thereby selecting such a combination of hoppers that the sum of weighed values falls within a predetermined weight range, and discharging the objects to be weighed in the hoppers forming the combination; a second combination discharging operation for performing a combination calculation using an arbitrary number of weighed values of the weighed values of the hoppers which have not been selected in the first combination discharging operation, thereby selecting such a combination of hoppers that the sum of weighed values falls within a predetermined weight range and discharging the objects to be weighed in the hoppers forming the combination; and a third combination discharging operation for performing a combination calculation using an arbitrary number of weighed values of the weighed values of the hoppers which have not been selected in the second combination discharging operation, thereby selecting such a combination of hoppers that the sum of weighed values falls within a predetermined weight range, and discharging the objects to be weighed in the hoppers forming the combination. In this embodiment, the objects to be weighed discharged from the weighing hoppers are temporarily accumulated in the collecting hopper. Therefore, discharging from the collecting hoppers is carried out in the next combination discharging operation.

As in the case where the collecting chutes are constituted so that the transport time $\alpha$ that elapses from when the gates of tile weighing hoppers 4 start to open, until the last object to be weighed which reaches the collecting hopper is fed to the collecting hoppers ranges from 0.9 time to 1.1 times as long as the weighing cycle time (T) as described above with reference to FIG. 3(b), a similar advantages can be obtained by so constituting the collecting chutes that the transport time $\alpha$ ranges from 0.9 time to 1.1 times as long as T/2 time in case where a double shift operation is performed, or that transport time $\alpha$ ranges from 0.9 time to 1.1 times as long as T/3 time in case where a triple shift operation is performed.

When a double shift operation or a triple shift operation is performed as mentioned above, the case where the operation of one weighing cycle (T) is repeated in succession, that is, the case where the time T of one weighing cycle is equal to one operation cycle time Tm in each of the combination weigher units A-D is described, but a time associated with a bottleneck such as the operation time tf of the linear feeders 2, transport time $\alpha 1$ and the like may exist in some cases, as already mentioned. In such a case, when the time associated with the bottleneck is one operation cycle time Tm, in double shift operation, operation can be such that discharging is carried out once in every Tm/2 time in each of the combination weigher units A-D, and each of the combination weigher units A-D can be operated with a time difference of Tm/8 time. Moreover, in triple shift operation, operation can be such that discharging is carried out once in every Tm/3 time in each of the combination weigher units A-D, and each of the combination weigher units A-D can be operated with a time difference of Tm/12 time. In case where there exists the time which is a bottleneck, for example, by using the operation time (tg) which requires the next longest time to the bottleneck, when a double shift operation is performed, tg/2 time is calculated and operation can be such that discharging is carried out once in every (tg/2+x1) time including an additional extra time x1 in each of the combination weigher units A-D, and each of the combination weigher units A-D is operated with a time difference of (tg/8+x¼) tine. Moreover, when a triple shift operation is performed, tg/3 time is calculated and operation can be such that discharging is carried out once in every (tg/3+x2) time including an additional extra time x2 in each of the combination weigher units A-D, and each of the combination weigher units A-D is operated with a time difference of (tg/12+x¼) time.

As for the transport time α and the constitution of collecting chutes in the case where an above-mentioned double shift operation is performed, the collecting chutes may be so constituted that the transport time α fall within the range from 0.9 time to 1.1 times as long as tm/2 time (when the transport time α is not a bottleneck). Similarly, as for the transport time a and the constitution of collecting chutes in the case where a triple shift operation is performed, the collecting chutes may be so constituted that the transport time α fall within the range from 0.9 time to 1.1 times as long as the Tm/3 time (when the transport time α is not a bottleneck).

Figure 5:
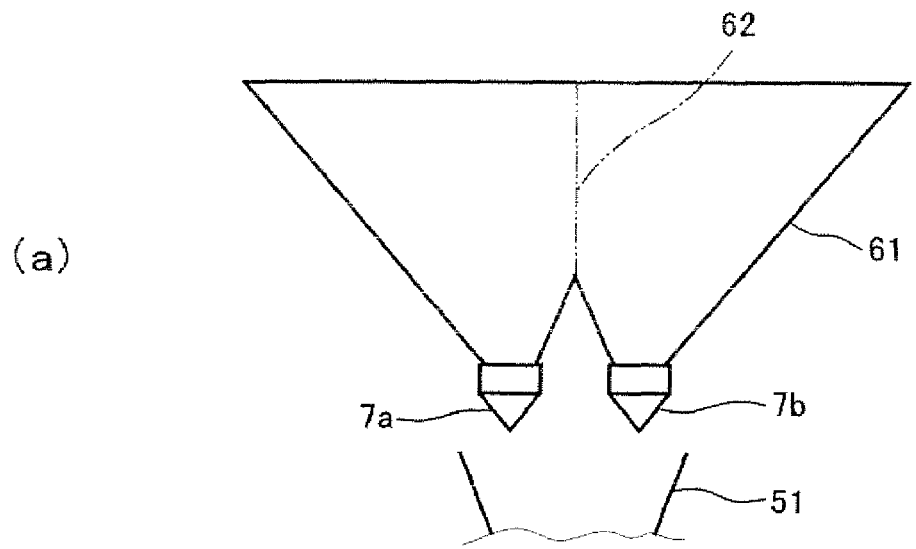
Figure 5:
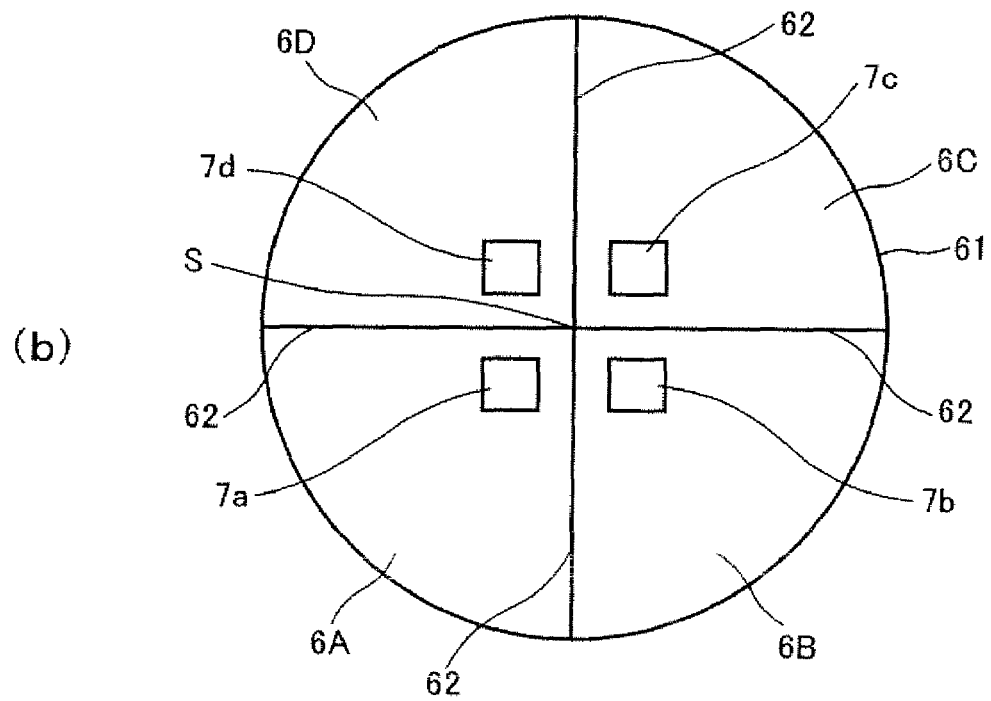

In this embodiment, in place of the collecting chutes and collecting hoppers shown in FIG. 1, the collecting chutes and collecting hoppers shown in FIG. 5 may be used. FIG. 5(*a*) is a schematic diagram of the collecting chutes and collecting hoppers seen laterally used in place of the collecting chutes and collecting hoppers shown in FIG. 1, and FIG. 5(*b*) is a schematic diagram of the collecting chutes and collecting hoppers seen from above shown in FIG. 5(*a*). In FIG. 1, integrally formed four collecting hoppers 7A-7D are provided in a central lower part of the chute 61 having a substantially inverted conical shape. The constitution in FIG. 5 is such that the outlets of the collecting chutes 6A-6D are provided apart from each other in a lower part near the center of the chute 61 having a substantially inverted conical shape and the collecting hoppers 7*a*-7*d* are provided at their outlets, respectively. The gates of the four collecting hoppers 7*a*-7*d* can be constituted in a manner similar to the conventional feeding hoppers 3 or the like. Moreover, the direction in which the collecting hoppers 7*a*-7*d* are disposed may be suitably selected. For example, they may be so disposed that the gates of the collecting hoppers 7*a*-7*d* open in the direction of a center S of the four collecting chutes 6A-6D. The constitution of FIG. 1 allows easier production of the collecting chutes, but the constitution of FIG. 5 allows easier production of the collecting hoppers.

In this embodiment, a constitution in which the collecting chute, which is conventionally a single piece, is divided into four pieces in the circumferential direction and four combination weigher units A-D are correspondingly provided is employed, but it is not limited to this constitution, and any constitution may be employed as long as the collecting chute, which is conventionally a single piece, is divided into N (N is a plural number) pieces in the circumferential direction, and N combination weigher units are correspondingly provided. In a constitution having N combination weigher units, in case where a single shift operation is performed, each combination weigher unit is operated in a preset order with a time difference of T/N time (T is a time for one weighing cycle), thereby allowing discharging at a rate that is N times faster than in a case where the entire device operates as a single combination weigher. Moreover, when a double shift operation is performed, it is so operated that discharging is carried out once in every T/2 time in each combination weigher unit (double shift operation) and each combination weigher unit is operated in a preset order with a time difference of T/2N time, whereby allowing discharging at a rate that is twice taster than in a case of a single shift operation. Moreover, when a triple shift operation is performed, it is so operated that discharging is carried out once in every T/3 time in each combination weigher unit (triple shift operation) and each combination weigher unit is operated in a preset order with a time difference of T/3N time, thereby allowing discharging at a rate that is three times faster than in a case of a single shift operation. Although the case where the time T of one weighing cycle is equal to one operation cycle time Tm is described as an example herein, as already mentioned, when there exists the time which causes a bottleneck longer than the time T of one weighing cycle, T in the above description can be replaced by Tm with the time which causes a bottleneck as one operation cycle time Tm.

In the case of the constitution in which two combination weigher units are provided and a single shift operation is performed, in contrast to a constitution of a double shift operation, in each combination weigher unit, the one entire operation cycle time Tm (equal to one weighing cycle time T when there is no bottleneck mentioned above) can be used as the time taken for allowing the objects to be weighed discharged from the weighing hoppers to gather together in the collecting hoppers and discharged as a chunk. Therefore, there is time sufficient to allow the objects to be weighed to gather together and to discharge the same, regardless of the type of the objects to be weighed, and the combination weigher can be adapted to packaging machines operated at a high speed for almost every kind of the objects to be weighed. Moreover, the constitution made to perform a single shift operation can obtain a similar weighing accuracy with a more compact constitution in contrast to the constitution made to perform a double shift operation. Therefore, the weigher can be adapted to a packaging machine operated at a high speed with a more compact constitution and a reduced size regardless of the type of the objects to be weighed as described above.

Figure 6:
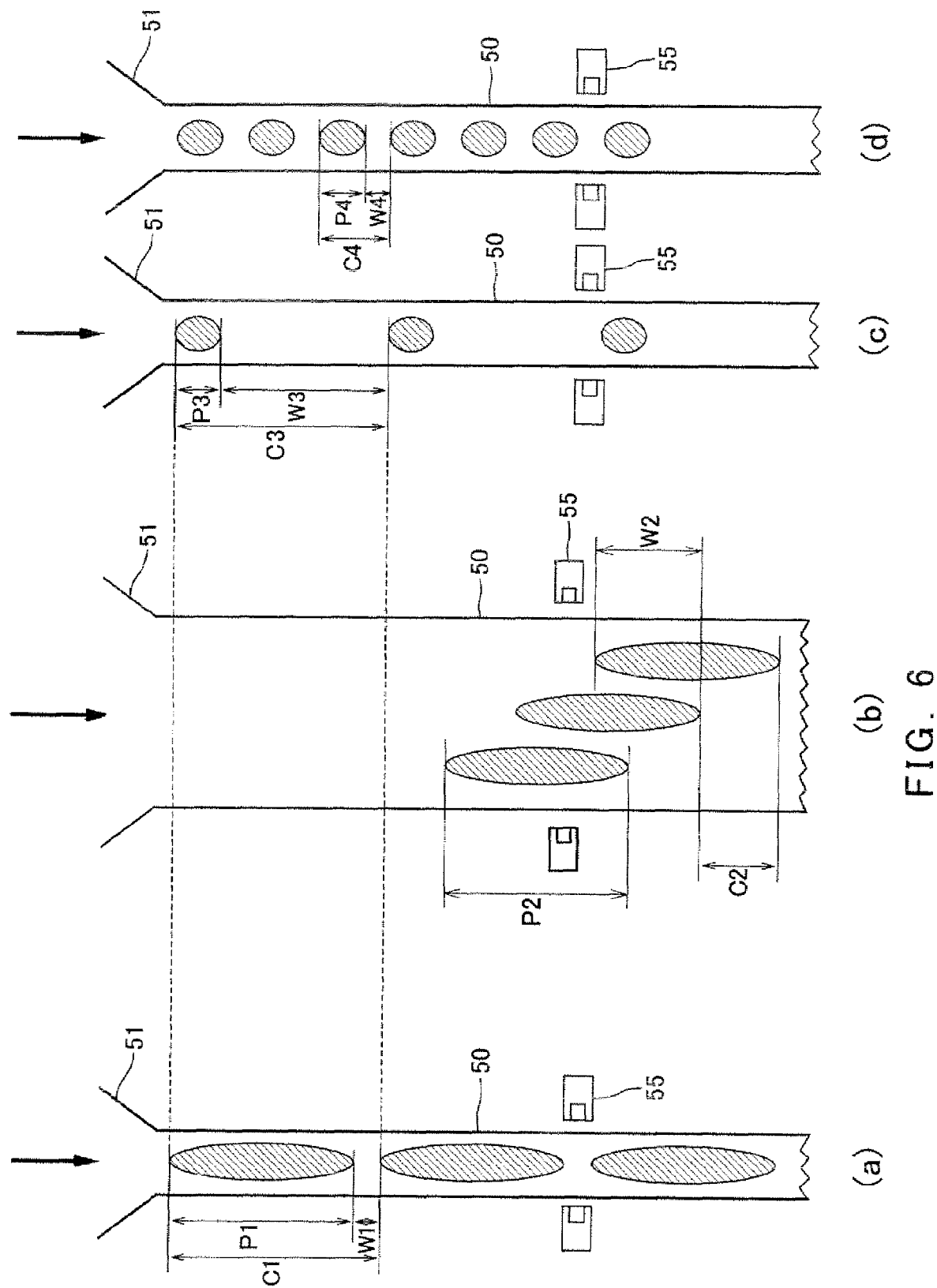
FIGS. 6(a)-6(d) are the drawings respectively showing examples of the states of the objects to be weighed discharged from the combination weigher falling inside the packaging machine.

Subsequently, the advantages of a constitution of a combination weigher comprising a plurality of combination weigher units each including separate collecting chutes and collecting hoppers will be specifically described with reference to FIGS. 6(*a*)-(*d*). FIGS. 6(*a*)-6(*d*) are the drawings respectively showing examples of the state of falling of the objects to be weighed discharged from the combination weigher inside the packaging machine. For example, they show the state of the objects to be weighed which are fed through the opening portion of the tube 51 of the vertical pillow packaging machine shown in FIG. 13 and failing inside the wrapping material 50 formed cylindrically and the horizontal sealing machine 55 which carries out horizontal sealing of the bag. Horizontal sealing has been already carried out by the horizontal sealing machine 55 at the lower end of the wrapping material 50, which is not shown. The former 52, pulldown belt 53 and vertical sealing machine 54 shown in FIG. 13 are omitted and not illustrated. In FIGS. 6(a)-6(d), one batch of the discharge from the combination weigher is shown as a chunk of the objects to be weighed.

Figure 12:
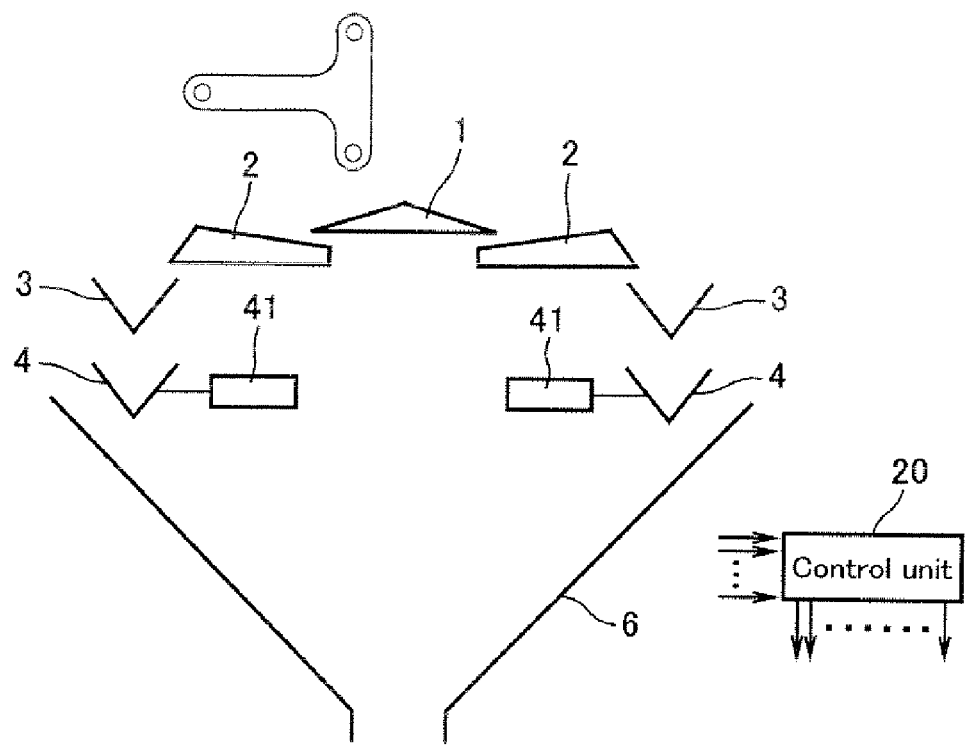
FIG. 12 is a schematic diagram showing a constitution of a conventional combination weigher.
Figure 13:
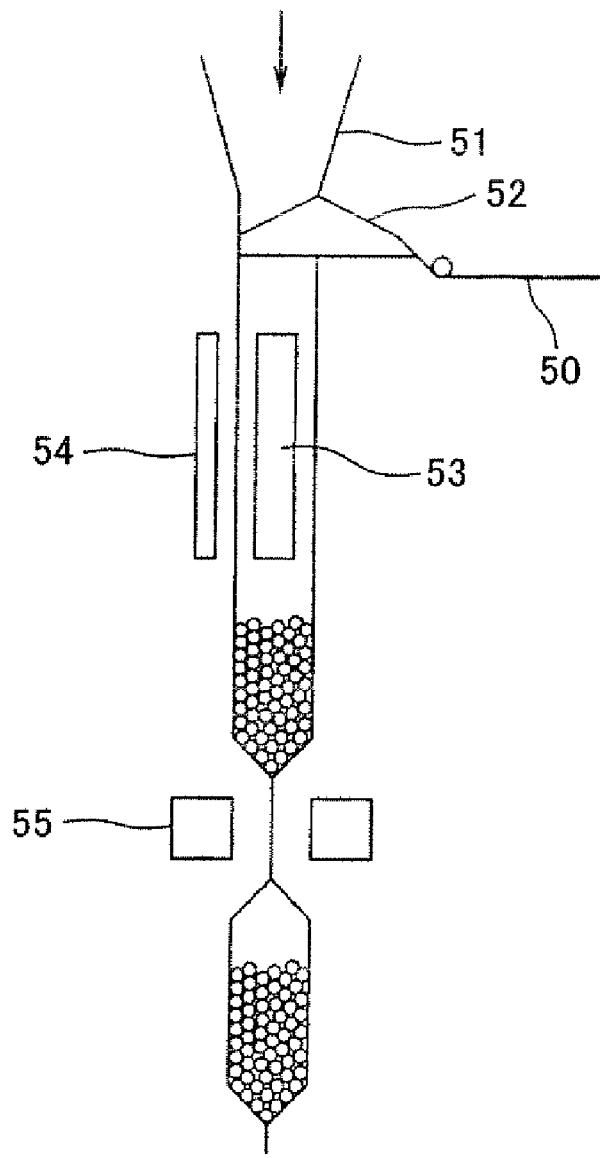
FIG. 13 is a schematic diagram showing a constitution of a packaging machine placed below the combination weigher.

FIG. 6(a) is a drawing showing an example of a state of falling of the objects to be weighed fed from, for example, a conventional combination weigher inside a packaging machine with no collecting hoppers provided as shown in FIG. 12. For example, it is assumed that the objects to be weighed such as potato chips (one chunk) falls down one after another with a falling pitch C1 of 1200 mm, and the length P1 from the upper end to the lower end of a batch of the falling objects to be weighed (hereinafter referred to as the batch length of the objects to be weighed) is 1000 mm. At this time, the batch distance W1=C1−P1 of the objects to he weighed which fall in succession is 200 mm. Herein, when the falling speed of the objects to be weighed is, for example, 1400 mm/sec., the time interval at which the objects to be weighed fall is 1200 mm÷1400 mm/sec.=0.8571, and the measurement speed of the combination weigher is 60 sec.÷0.8571 sec./time=70 times/min. The falling pitch is a distance from the lower end (or upper end) of a certain batch of the objects to be weighed to the lower end (or upper end) of the next batch of the objects to be weighed.

To carry out horizontal sealing by the packaging machine, the horizontal seating machine 55 needs to be operated so that the wrapping material 50 is sandwiched at the space between the batches of the objects to be weighed by the horizontal sealing machine 55. Accordingly, if the batch distance (W1) of the objects to be weighed is less than about 200 mm., the objects to be weighed may be stuck within the sealed portion Of the package bag. Therefore, if the measurement speed of the combination weigher (discharging speed) is increased further from the state shown in FIG. 6(a), the falling pitch (C1) is reduced but the batch length (P1) of the objects to be weighed stays constant. Therefore, the batch distance (W1=C1−P1) of the objects to be weighed is reduced, thereby causing the objects to be weighed to be stuck within the sealed portion of the package bag. Therefore, the speed cannot to be increased any more.

FIG. 6(b) is a drawing showing the state of the objects to be weighed in which the speed at which it is fed is three times faster than in the state shown in FIG. 6(a), that is, the state of hilling of the objects to be weighed when the measurement speed of the combination weigher is 210 times/min. The FIG. 6(b) is not drawn as it is to facilitate explanation. The falling pitch C2 of the batches of the objects to be weighed in this case is 400 mm, the batch length P2 of the objects to be weighed is 1000 mm, as in the case of FIG. 6(a), and the batch distance W2=C2−P2 of the objects to be weighed is −600 mm. Therefore, the objects to be weighed which fall in succession overlap one above the other. Consequently, the batches of the objects to be weighed, which are sequentially falling, will be completely overlapped, and thus they fall without any space, and therefore they will be stuck within the sealed portion of the package bag. In this case, the speed of 210 times/min. can be realized by causing the conventional combination weigher shown in FIG. 12 to perform a triple shift operation, but as mentioned above, the objects to be weighed cannot be prevented from being stuck within the sealed portion of the package bag.

For this reason, as in this embodiment, a constitution of three combination weigher units comprising separate collecting chutes and collecting hoppers is provided, whereby the objects to be weighed can be prevented from being stuck in an end region of the package bag. This will be further described with reference to FIGS. 6(c) and 6(d).

FIG. 6(c) is a drawing showing, for example, the state of falling of the objects to be weighed discharged from the collecting hopper in the interior of the packaging machine, in which a collecting hopper is provided at the outlet of the collecting chute 6 of a conventional combination weigher as shown in FIG. 12 and the measurement speed is the same as in the case of FIG. 6(a). In this case, although the falling pitch C3 of the batches of the objects to be weighed is not changed from 1200 mm, the objects to be weighed is temporarily stored in the collecting hoppers and then discharged. Therefore, the batch length P3 of the objects to be weighed is reduced to 200 mm and the batch distance W3 of the objects to be weighed falling sequentially is 1000 mm. Therefore, providing the collecting hoppers increases the hatch distance between the objects to be weighed, thereby allowing horizontal sealing in the packaging machine at flexible timing.

FIG. 6(d) is a drawing which shows the state of falling of the objects to be weighed in a case where, as in this embodiment, a constitution which has three combination weigher units respectively including separate collecting chutes and collecting hoppers is provided, and it is so operated that discharging timing from the collecting hoppers of each combination weigher unit is carried out with a time difference of T/3 time (T is one weighing cycle time of each combination weigher unit). In this case, as in the case of FIG. 6(c), the batch length P4 of the objects to be weighed discharged from the collecting hoppers is 200 mm. Therefore, by setting the batch distance W4 of the objects to be weighed to a minimum value which can prevent the objects to he weighed from being stuck within the sealed portion of the package bag, i.e., 200 mm, the failing pitch C4 can be shortened to 400 mm. At this time, the time intervals at which the batches of the objects to be weighed fall is 400÷1400 mm/sec.=0.2857 sec., and the measurement speed is 60 sec.÷0.2857 sec./time=210 times/min. That is, it suffices that the measurement speed of each combination weigher unit is 70 times/min.

Therefore, as in this embodiment, a constitution which has three combination weigher units each respectively including separate collecting chutes and collecting hoppers is provided, and it is so operated that discharging timing from the collecting hoppers of each combination weigher unit is carried out with a time difference of T/3 time, whereby a measurement speed that is three times faster can be achieved. In this examples the batch length (P4) of the objects to be weighed which is discharged from the collecting hoppers and is falling inside the packaging machine is 200 mm and the minimum value of the batch distance (W4) between the objects to be weighed is 200 mm. However, this value varies depending on the objects to be weighed and the performance of the packaging machine. Presently, the upper limit of the performance of a vertical pillow packaging machine is about 210 times/min., but if the performance of the packaging machine is improved and a faster vertical pillow packaging machine is developed, the performance of the combination weigher can be easily matched to the ability of the packaging machine by increasing the number of the combination weigher units N. Therefore, the higher the ability of the packaging machine, the more noticeable the effect of the invention.

Figure 7:
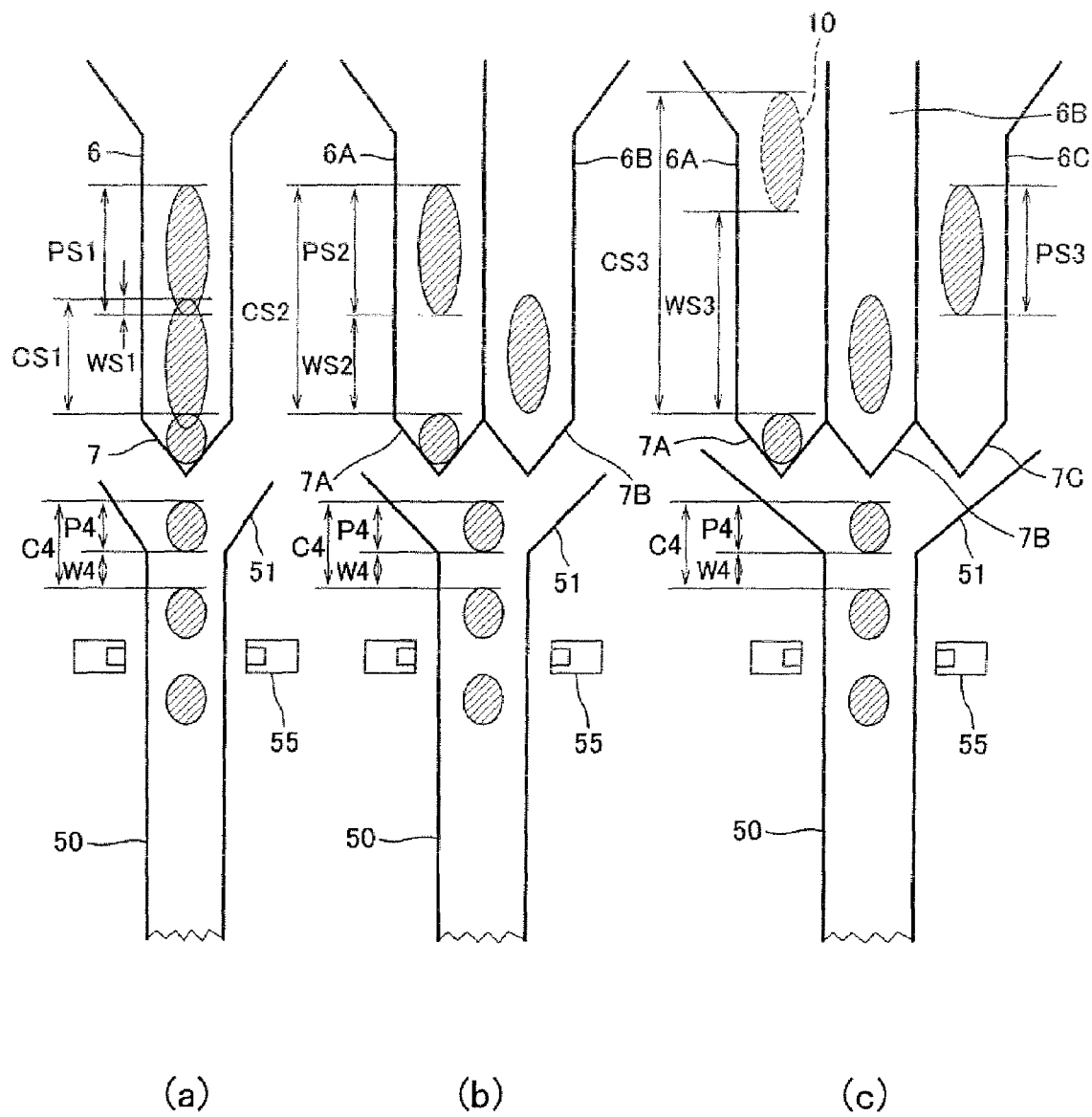
FIGS. 7(a)-7(c) are drawings for explaining the advantages of a constitution having three or more combination weigher units in this embodiment.

Further, it will be described with reference to FIG. 7 that providing a constitution having three or more combination weigher units provides very high merit in this embodiment.

FIG. 7(a) is a drawing which shows the state of falling of the objects to be weighed in the interior of the combination weigher and packaging machine, the combination weigher including, for example a collecting hopper provided at the outlet of the collecting chute 6 of a conventional combination weigher as shown in FIG. 12. FIG. 7(b) is a drawing which shows the state of falling of the objects to be weighed in the interior of the combination weigher which have a constitution in which two combination weigher units are provided in this embodiment and in the interior of the packaging machine. FIG. 7(c) is a drawing which shows the state of falling of the objects to be weighed in the interior of the combination weigher which have a constitution in which three combination weigher units are provided in this embodiment and in the interior of the packaging machine. In FIGS. 7(a)-7(c), the packaging machines are shown on the lower side as in FIGS. 6(a)-6(d), and the collecting chutes and collecting hoppers of the combination weigher are shown on the upper side, which are not drawn as it is. Moreover, the objects to be weighed are also shown as in FIGS. 6(a)-6(d).

In the case of FIG. 7(a), the gate of the collecting hopper 7 provided at the outlet of the collecting chute 6 of the combination weigher is opened and closed to discharge the objects to be weighed. In the case of FIG. 7(b), collecting hoppers 7A, 7B are provided at the outlets of the collecting chutes 6A, 6B of two combination weigher units, respectively, and the gates of the collecting hopper 7A and collecting hopper 7B are opened and closed at different times to discharge the objects to be weighed. In the case of FIG. 7(c), collecting hoppers 7A, 7B, 7C are provided at the outlets of the collecting chutes 6A, 6B, 6C of three combination weigher units, respectively, and the gates of the collecting hopper 7A, collecting hopper 7B and collecting hopper 7C are opened and closed with a time difference to discharge the objects to be weighed. In FIGS. 7(a), 7(b) and 7(c), the objects to be weighed discharged through the combination weighers are fed from the opening portion of the tube 51 of the packaging machine and fall inside the wrapping material 50, and the horizontal sealing machine 55 is operated to carry out horizontal sealing aiming at the space between the batches of the falling objects to be weighed. Therefore, to prevent the objects to be weighed from being stuck within the sealed portion of the package bag, the batch distance of the objects to be weighed which fall in succession needs to be about 200 mm or more, as already mentioned. In all the combination weighers of FIGS. 7(a), 7(b) and 7(c), a collecting hopper is provided. Therefore, as mentioned in the description of FIG. 6(d), the batch distance W4 between the objects to be weighed in the packaging machine is achieved to be 200 mm. In addition, since the objects to be weighed gather together in the collecting hoppers and then are discharged to the packaging machine, the batch length P4 of the objects to be weighed in the packaging machine is also 200 mm. This makes the falling pitch C4 400 mm, and thus operation at the measurement speed which corresponds to the present maximum performance (maximum packaging speed) of vertical pillow packaging machines, i.e., 210 times/min. is seemingly possible in any of three combination weighers of FIGS. 7(a), 7(b) and 7(c). However, as will be mentioned later, serious troubles occur in actual operation in cases of the combination weighers of FIGS. 7(a) and 7(b). The operation speed of the packaging machine is assumed to be maximum, i.e. 210 times/min., in the below.

In any cases of FIGS. 7(a)-7(c), for example, the objects to be weighed such as potato chips are discharged from the weighing hoppers, slide down on the collecting chutes and are temporarily retained in the collecting hoppers. This distance from the weighing hoppers to the collecting hoppers that the objects to be weighed fall is set to, for example, 600 mm, and the falling speed of the objects to be weighed is set to, for example, 1400 mm/sec. (they vary in actual operation, but are assumed to be constant herein).

In the case of FIG. 7(a), since the operation speed of the packaging machine is 210 times/min., the measurement speed of the combination weigher is also 210 times/min. At this time, when the falling speed of the objects to be weighed which falls into the collecting hoppers 7 is 1400 mm/sec. as mentioned above, the falling pitch CS1 of the batches of the objects to be weighed is 1400 mm/sec.×60 sec.÷210 times/min.=400 mm, and batches of the objects to be weighed fall at a pitch of 400 mm. When the batch length PS1 of the objects to be weighed is 500 mm herein, the batch distance WS1=CS1−PS1 of the objects to be weighed falling sequentially is −100 mm, which causes the objects to be weighed to overlap by 100 mm.

Therefore in this case, irrespective of the timing at which the gates of the collecting hoppers 7 are opened and closed, the objects to be weighed are stuck in the gates. In addition, since one batch of the objects to be weighed cannot be clearly distinguished from other batches, it is difficult to correctly feed into a package bag one batch of the objects to be weighed, and the weight of the objects to be weighed in the package bag contains great errors. Therefore, this constitution is unsuitable for practical use.

In the case of FIG. 7(b), since the operation speed of the packaging machine is 210 times/min., the measurement speed (discharging speed) necessary for each of the two combination weigher units is 210 times/min. ÷2=105 times/mill. Therefore, the falling pitch CS2 of the batches of the objects to be weighed which fall into the collecting hoppers 7A, 7B is 800 mm. Because the batch length PS2 of the objects to be weighed is 500 mm, the batch distance WS2 of the consecutive objects to be weighed is 300 mm, and the causes of the collecting hoppers getting stuck and causes of weight errors in a package bag, which are illustrated in FIG. 7(a), are eliminated.

However, since the falling distance of the objects to be weighed from the weighing hoppers to the collecting hoppers is 600 mm and the falling pitch CS2 is as short as 800 mm, the batch distance WS2 of the objects to be weighed is only 300 mm. Therefore, discharging from the weighing hoppers must be started before the preceding objects to be weighed gather together in the collecting hoppers and discharging from the collecting hoppers to the packaging machine therebelow is started. This is not a problem when the packaging machine is operated without stopping or any trouble, but serious problems occur when the packaging machine is stopped, for example, when a package film of the packaging machine or a film for printing date is used up. In the combination weigher of FIG. 7(b), since the objects to be weighed need to be discharged from the weighing hoppers before the collecting hoppers are opened on a basis of a feed command signal of the packaging machine, two batches of the objects to be weighed are accumulated in the collecting hoppers 2 each time the packaging machine stops. If they are discharged into the packaging machine, very large errors may occur in the weights in package bags. Therefore, this constitution cannot be substantially put into practical use either. Of course, it is possible to wait discharging from the weighing hoppers until the collecting hoppers start to open by reducing the operation speed of the combination weigher, but this creates a serious problem that the maximum performance of the packaging machine cannot be achieved.

Hence, the following will describe that providing a constitution having the three combination weigher units as shown in FIG. 7(c) can solve all of these problems.

Since the operation speed of the packaging machine is 210 times/min., the measurement speed (discharging speed) necessary for each of the three combination weigher units is 210 times/min.÷3=70 times/min. Therefore, the falling pitch CS3 of the batches of the objects to be weighed which fall into the collecting hoppers 7A, 7B is 1200 mm. Since the batch length PS3 of the objects to be weighed is 500 mm, the batch distance WS3 of the objects to be weighed is 700 mm. Therefore, the causes of the collecting hoppers getting stuck and causes of weight errors in package bags, which are illustrated in FIG. 7(a), are eliminated.

In FIG. 7(c), the objects to be weighed 10 indicated by the broken line is virtually shown for the purpose of explanation, and it is in reality kept in the weighing hoppers. This is because the distance which the objects to be weighed fall from the weighing hoppers to the collecting hoppers is 600 mm. and therefore the falling pitch CS3 is as long as 1200 mm and the batch distance WS3 of the objects to be weighed is 700 mm. Accordingly, the preceding objects to be weighed gather together in the collecting hoppers, and when the gate of the collecting hopper 7A is opened on a basis of a feed command signal of the packaging machine, the next objects to be weighed 10 is still in the weighing hoppers. Therefore, the drawback of the case where there are two combination weigher units described with reference to FIG. 7(b), i.e., the problem that two batches of the objects to be weighed that are discharged are accumulated in the collecting hoppers when the packaging machine stops is solved.

Thus, providing a constitution having three combination weigher units in this embodiment can solve all of these problems. Moreover, the measurement speed of 70 times/min. necessary for each combination weigher unit is achievable by a single shift operation in each combination weigher unit, whereby all the combination weigher units can have more compact constitutions.

Further, making the number of the combination weigher units four facilitates an operation at 280 times/min. As the number of the combination weigher units is increased in such a manner, the measurement speed of the entire combination weigher can be faster. However, it also increases the size of the apparatus. Considering this, the maximum number of the combination weigher units is desirably about ten.

In this embodiment, the combination weigher units A-D are operated in a preset order with a predetermined time difference (T/4 time in the case of FIG. 3 (A), T/8 time in the case of FIG. 4), and discharging from each of the collecting hoppers 7A-7D is also carried out in a preset order. However, due to the shortage or maldistribution of the objects to be weighed on the dispersion feeder 1, in one of the combination weigher units, there may be no such combinations that the total weight of the objects to be weighed does not fail within a permissible range (predetermined weight range). In this case, discharging from the weighing hoppers 4 into the collecting hoppers is not carried out in the combination weigher unit, and the objects to be weighed cannot be discharged from the collecting hoppers (discharge from the collecting hoppers is not ready). When there are no combinations which fall within a predetermined weight range, the combination calculation is carried out again after the objects to be weighed is additionally fed or fed again into the weighing hoppers 4 in the combination weigher unit. Therefore, If an attempt is made to precisely keep the discharging order of the collecting hoppers, one weighing cycle time is required until discharging in the combination weigher unit is ready next. This is a problem peculiar to combination weighers. For example, in a constitution having N combination weigher units, when the combination weigher units are at a single shift operation and there is no combination that falls within a predetermined weight range as a result of a combination calculation in one of the combination weigher units (that is, in a case of combination failure), the packaging machine enters a standby state during the above-mentioned one weighing cycle time to keep the discharging order of the collecting hoppers, whereby N times (operations for N package bags) of packaging operations are not performed. Thus, in such a case, after discharging from the collecting hoppers of the combination weigher unit has failed, that collecting hopper is skipped and the turn is given to the collecting hoppers of the combination weigher unit to discharge next. For example, when the discharging order of the collecting hoppers 7A-7D in FIGS. 1 and 3 is predetermined to the order of 7A, 7B, 7C, 7D and there are no combinations which fall within a predetermined weight range as a result of a combination calculation carried out in the combination weigher unit A, the discharging operation of the collecting hopper 7A based on a feed command signal a is not performed, and the collecting hopper 7A is skipped and the discharging operation of the collecting hopper 7B is performed based on the next feed command signal b. Subsequently, the discharging operation of the collecting hopper 7C next to the collecting hoppers 7B is performed. This allows the packaging machine to miss the packaging operation only once, and a decrease in the operating rate of the packaging machine can be minimized. Alternatively, discharging may be started sequentially with the collecting hoppers which are ready for discharging without predetermining the discharge order of the collecting hoppers. Also in this case, a decrease in the operating rate of the packaging machine can be minimized as in the above.

The following will discuss the case, as already stated, where the objects to be weighed cannot be successively discharged from the collecting hoppers of the same combination weigher unit due to the occurrence of a series of combination failures or other problems in this combination weigher unit, under the condition in which the discharging order of the collecting hoppers is predetermined and the turn of the collecting hopper is skipped if discharging of the collecting hoppers is not ready in one of the combination weigher units because of combination failure or the like, or under the condition in which the discharging order of the collecting hoppers is not predetermined and discharging is executed according to the order in which the collecting hoppers become ready to discharge. In this case, the packaging machine does not perform an operation once in every twice in a combination weigher comprising two combination weigher units; skips an operation once in every three times in a combination weigher comprising three combination weigher units; and the packaging machine does not perform an operation once in every four times in a combination weigher comprising four combination weigher units. Accordingly, a constitution comprising three or more combination weigher units is preferred.

Figure 8:
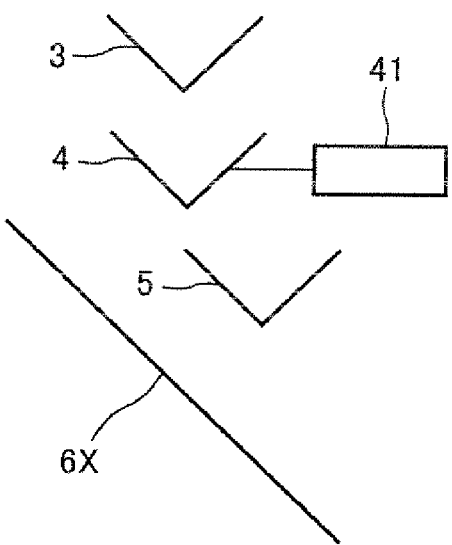
FIG. 8 is a schematic diagram showing another example of hoppers for use in a combination weigher of an embodiment of the present invention.

The case where the weighing hoppers 4 are the only participants in the combination is described in this embodiment, but the memory hoppers 5 may be provided obliquely below the corresponding weighing hoppers 4, respectively, shown in FIG. 8 as participants in the combination. In this case, the weighing hoppers 4 is constituted so as to discharge the objects to be weighed selectively into the collecting chute 6x (6A-6D) and memory hoppers 5. When the memory hoppers 5 become empty, the objects to be weighed are fed from the weighing hoppers 4. In each combination weigher unit, a combination calculation by the control unit 21 determines a combination of hoppers (discharge hopper) to carry out discharging a plurality of the weighing hoppers 4 and the memory hoppers 5) to carry out discharging among a plurality of the weighing hoppers 4 and the memory hoppers S, and the objects to be weighed are discharged from the discharge hoppers corresponding to the combination into the collecting chute 6x. The weight of the objects to be weighed in the memory hoppers 5 used in the combination calculation is that weighed in the weighing hoppers 4 provided above.

For example, in the constitution of FIG. 1, in order to achieve a performance which is similar to that in the case where each of the combination weigher units A-D is provided with ten weighing hoppers 4 and performs a single shift operation as mentioned above, it suffices that each of the combination weigher units A-D is provided with only five weighing hoppers 4 and five memory hoppers 5, thereby reducing the number of the expensive weight sensors 41 by half.

As shown in FIG. 9, each of the memory hoppers 5 may have two containing chambers 5a, 5b. In this case, the weighing hoppers 4 are constituted in such a manner that the objects to be weighed can be discharged selectively into the containing chamber 5a and containing chamber 5b of the memory hopper 5, and the objects are not discharged into the collecting chute 6x. The two containing chambers 5a, 5b of the memory hopper S have such a constitution that they can independently discharge the objects to be weighed. A combination calculation is carried out, for example, by using the weight of the objects to be weighed in the containing chambers 5a, 5b of each of the memory hopper 5, and the containing chambers 5a, 5b participate in the combination and the weighing hoppers 4 do not participate in the combination. The weights weighed in the weighing hoppers 4 disposed above the containing chambers 5a, 5b are used as the weights of the objects to be weighed in each of the containing chambers 5a, 5b. The weighing hoppers 4 can also participate in the combination on condition that a combination of any of the weighing hoppers 4 and either of the containing chambers 5a, 5b of the memory hopper 5 corresponding to the weighing hopper 4, which are selected together, is valid. For example, when the corresponding weighing hoppers 4 and a containing chamber 5a of a memory hopper 5 are selected together, the objects to be weighed in the weighing hoppers 4 pass through the containing chamber 5a and are discharged into the collecting chute 6X.

Figure 10:
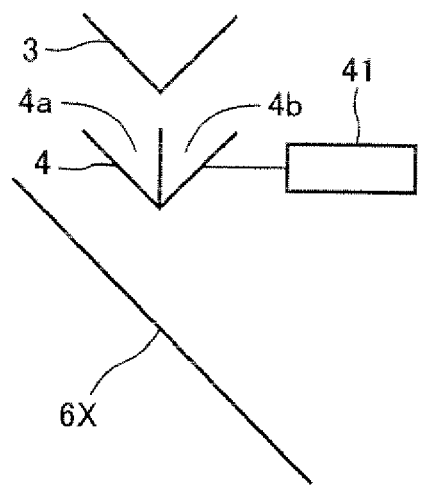
FIG. 10 is a schematic diagram showing another example of hoppers for use in a combination weigher of an embodiment of the present invention.

As shown in FIG. 10, each of the weighing hoppers 4 may have two weighing chambers 4a, 4b. In the constitution of this case, the feeding hoppers 3 can selectively discharge the objects to be weighed into the weighing chamber 4a and weighing chamber 4b) of the weighing hoppers 4 and the two weighing chambers 4a, 4b of the weighing hoppers 4 can independently discharge the objects to be weighed. The combination calculation is carried out by using the weight of the objects to be weighed in the weighing chambers 4a, 4b of the weighing hoppers 4, and the weighing chambers 4a, 4b participate in the combination. In each of the weighing hoppers 4 having the two weighing chambers 4a, 4b, when the objects to be weighed are provided only in one of the weighing chambers, for example the weighing chamber 4a, the weight of the objects to be weighed in the weighing chamber 4a is weighed by the weight sensor 41. When the objects to be weighed are provided in the other weighing chamber 4b, the total weight of the objects to be weighed in the two weighing chambers 4a, 4b is weighed by the weight sensor 41. In the control unit 21 (refer to FIG. 1), the weight of the objects to be weighed in the weighing chamber 4a are subtracted from the total weight of the objects to be weighed in these two weighing chambers 4a, 4b, whereby the weight of the objects to be weighed in the weighing chamber 4b is calculated to carry out a combination calculation.

As shown in FIG. 11, each of the weighing hoppers 4 may have two weighing chambers 4a, 4b, and the memory hoppers 5 having the two containing chambers 5a, 5b corresponding to the weighing chambers 4a, 4b of the weighing hoppers 4 may be further provided below the weighing hoppers 4, respectively. In the constitution of this case, the feeding hoppers 3 can discharge the objects to be weighed selectively into the weighing chamber 4a and weighing chamber 4b of the weighing hoppers 4. The objects to be weighed in the weighing chamber 4a of the weighing hoppers 4 are sent into the containing chamber 5a of the memory hoppers 5, and the objects to be weighed in the weighing chamber 4b of the weighing hoppers 4 are sent into the containing chamber 5b of the memory hoppers 5. The combination calculation is carried out, for example, by using the weight of the objects to be weighed in the containing chambers 5a, 5b of the memory hoppers 5. The containing chambers 5a, 5b participate in the combination, while the weighing hoppers 4 do not participate in the combination. The weights weighed and calculated in the weighing chambers 4a, 4b of the weighing hoppers 4, disposed above the containing chambers 5a, 5b, are used as the weight of the objects to be weighed in the containing chambers 5a, 5b. The weighing chambers 4a, 4b of the weighing hoppers 4 may also participate in the combination on condition that only combination in which a weighing chamber 4a, 4b and a corresponding containing chamber 5a, 5b, respectively, are selected together are valid. For example, when the weighing chamber 4a and the corresponding containing chamber 5a are simultaneously selected, the objects to be weighed in the weighing chamber 4a is discharged into the collecting chute 6x through the containing chamber 5a.

When the hoppers shown in FIGS. 8-11 are used, as already state, their constitution is not limited to that for performing a single shift operation, but also can be that for performing a double shift operation or a triple shift operation.

The combination weigher of this embodiment comprises the dispersion feeder 1, linear feeders 2 and feeding hoppers 3, but their constitution is not limited, and other, constitutions may be used depending on the type of the objects to be weighed (powders, chunks) or the like as long as a means for supplying the objects to be weighed into the weighing hoppers 4 is provided. Moreover, the control unit 21 is not limited to being configured as the single control apparatus, but instead may be configured to include a plurality of control apparatuses disposed in a distributed manner, and these components may be constituted in such a manner that these components co-operate to control the operation of the combination weigher.

Many improvements and other embodiments of the present invention are obvious for persons skilled in the art from the above description. Therefore, the above descriptions should only be interpreted as examples, and are provided for the purpose of teaching the best mode for carrying out the present invention to persons skilled in the art. The details of constitution and/or functions can be substantially modified unless the spirit of the present invention is departed from.

INDUSTRIAL APPLICABILITY

The present invention is useful as a combination weigher which can be adapted to a high-speed packaging machine.

The invention claimed is:

1. A combination weigher comprising:
N groups of combination hoppers which are N hopper lines of arcuate sections composing a line of combination hoppers including a plurality of circularly arranged combination hoppers for receiving objects to be weighed; wherein N is a plural number;
N collecting chutes disposed below the groups of combination hoppers to respectively correspond to the groups of combination hoppers for collecting the objects to be weighed discharged from the combination hoppers of the corresponding groups of combination hoppers and discharging the same from an outlet provided in a lower portion thereof;

N collecting hoppers provided at the outlets of the collecting chutes to respectively correspond to the groups of combination hoppers and the collecting chutes, for temporarily retaining the objects to be weighed discharged from the outlets of the collecting chutes, and the collecting hoppers arranged to then discharge the objects to be weighed into a single inlet of a packaging machine; and a control means for repeatedly carrying out, with respect to the groups of combination hoppers and the corresponding collecting hoppers, a series of processes including a combination process for performing a combination calculation on a basis of the weight of the objects to be weighed fed into each combination hopper of the groups of combination hoppers and determining a single combination of the combination hoppers which causes the total weight of the fed objects to be weighed falls within a predetermined weight range, a discharge preparation process for discharging the objects to be weighed from the combination hoppers forming the combination determined by the combination process, and a discharge process for discharging from the collecting hoppers the objects to be weighed, discharged from the combination hoppers and retained in the collecting hoppers, the control means carrying out the combination process and the discharge preparation process with respect to each of the groups of combination hoppers sequentially with a time difference 1/N of one operation cycle time, and carrying out the discharge process with respect to each of the collecting hoppers sequentially with a time difference of 1/N of the one operation cycle time, the one operation cycle time being the time taken from the start of discharging of the objects to be weighed from the combination hoppers forming the combination determined by the combination process, followed by feeding of the objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process.

2. A combination weigher according to claim 1, wherein the number of the groups of combination hoppers, the collecting chutes and the collecting hoppers is two (N=2).

3. A combination weigher according to claim 1, wherein the control means performs the discharge process according to a preset order of the collecting hoppers for carrying out the discharge process, and in carrying out the discharge process with respect to an arbitrary collecting hoppers, when the discharge preparation process has not been carried out with respect to the groups of combination hoppers corresponding to the arbitrary collecting hoppers prior to carrying out the discharge process, does not perform the discharge process with respect to the arbitrary collecting hoppers once, and then carries out the discharge process with respect to the next collecting hoppers to be processed subsequently to the arbitrary collecting hoppers, skipping the arbitrary collecting hoppers.

4. A combination weigher according to claim 1, wherein the control means sequentially selects from all of the collecting hoppers corresponding to the groups of combination hoppers with respect to which the discharge preparation process is carried out, and performs the discharge process with respect to the selected collecting hoppers.

5. A combination weigher according to claim 3, wherein the number of the groups of combination hoppers, the collecting chutes and the collecting hoppers is three or more (N≧3).

6. A combination weigher according to claim 1, wherein to adapt the combination weigher to the packaging machine which is operated at a speed that requires that the next discharge preparation process is started before the discharge process is started with respect to the corresponding groups of combination hoppers and the corresponding collecting hoppers if the number of the groups of combination hoppers, the collecting chutes and the collecting hoppers is two, the number of the groups of combination hoppers, the collecting chutes and the collecting hoppers is three or more (N≧3).

7. A combination weigher according to claim 1, wherein the collecting chutes are so constituted that the time taken for all of the objects to be weighed discharged to pass through the collecting chutes and be fed into the collecting hoppers from the start of discharging of the objects to be weighed from the combination hoppers forming the combination determined by the combination process falls within the range of 0.9 time to 1.1 times as long as the one operation cycle time.

8. A combination weigher comprising:

N groups of combination hoppers which are N hopper lines of arcuate sections composing a line of combination hoppers including a plurality of circularly arranged combination hoppers for receiving objects to be weighed, wherein N is a plural number;

N collecting chutes disposed below the groups of combination hoppers to respectively correspond to the groups of combination hoppers, for collecting the objects to be weighed discharged from the combination hoppers of the corresponding groups of combination hoppers and discharging the same from an outlet provided in a lower portion thereof;

N collecting hoppers provided at the outlets of the collecting chutes to respectively correspond to the groups of combination hoppers and the collecting chutes, for temporarily retaining the objects to be weighed discharged from the outlets of the collecting chutes, and the collecting hoppers arranged to then discharge the objects to be weighed into only a single inlet of a packaging machine; and a control means for repeatedly carrying out, with respect to each weighing unit including the groups of combination hoppers and the corresponding collecting hoppers, a series of processes including a combination process for performing a combination calculation on a basis of the weight of the objects to be weighed in an arbitrary number of combination hoppers of all the combination hoppers constituting the groups of combinations hoppers and determining a single combination of the combination hoppers which causes the total weight of the fed objects to be weighed fall within a predetermined weight range, a discharge preparation process for discharging the objects to be weighed from the combination hoppers forming the combination determined by the combination process, and a discharge process for discharging from the collecting hoppers the objects to be weighed, discharged from the combination hoppers and retained in the collecting hoppers, the control means carrying out the series of processes with respect to each weighing unit once in every 1/k of one operation cycle time, and carrying out the series of processes with a time difference of 1/(k×N) of the one operation cycle time according to a series of the weighing units, k being an integer of 2 or more, the one operation cycle time being the time taken from the start of discharging of the objects to be weighed from the combination hoppers forming the combination determined by the combination process, followed by feeding of the objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process.

9. A combination weigher according to claim 8, wherein the control means performs the discharge process according to a preset order of the collecting hoppers for carrying out the discharge process, and in carrying out the discharge process with respect to an arbitrary collecting hoppers, when the discharge preparation process has not been carried out with respect to the groups of combination hoppers corresponding to the arbitrary collecting hoppers prior to carrying out the discharge process, does not perform the discharge process with respect to the arbitrary collecting hoppers once, and then carries out the discharge process with respect to the next collecting hoppers to be processed subsequently to the arbitrary collecting hoppers, skipping the arbitrary collecting hoppers.

10. A combination weigher according to claim 8, wherein the control means sequentially selects from all of the collecting hoppers corresponding to the groups of combination hoppers with respect to which the discharge preparation process is carried out, and performs the discharge process with respect to the selected collecting hoppers.

11. A combination weigher according to claim 8, wherein the collecting chutes are so constituted that the time taken for all of the objects to be weighed discharged to pass through the collecting chutes and be fed into the collecting hoppers from the start of discharging of the objects to be weighed from the combination hoppers forming the combination determined by the combination process falls within the range of 1.9 time to 1.1 times as long as 1/k of the one operation cycle time.

12. A combination weigher according to claim 1, wherein the combination hoppers are weighing hoppers which weigh the weight of the fed objects to be weighed.

13. A combination weigher according to claim 1, wherein two lines of combination hoppers are arranged in a vertical order, the combination hoppers of the upper line are weighing hoppers for weighing the weight of the fed objects to be weighed, the combination hoppers of the lower line are memory hoppers which are provided to respectively correspond to the weighing hoppers, the objects weighed by the weighing hoppers being fed into the memory hoppers, and the weighing hoppers are configured to discharge the objects to be weighed selectively to the corresponding memory hoppers and the corresponding collecting chute.

14. A combination weigher according to claim 1, wherein a plurality of weighing hoppers for weighing the weight of the fed objects to be weighed are provided above the combination hoppers correspondingly to the combination hoppers, respectively;

the combination hoppers are memory hoppers each comprising two containing chambers into which the objects weighed by the weighing hoppers is separately fed, the memory hoppers being capable of independently discharging the objects to be weighed fed into each of the containing chambers thereof;

the weighing hoppers are constituted in such a manner that the objects to be weighed can be selectively discharged into the two containing chambers of the corresponding memory hoppers; and the control means performing a combination calculation performed for each of the groups of combination hoppers on a basis of the weight of the objects to be weighed fed into the containing chambers of the memory hoppers, determining a combination of the containing chambers of the memory hoppers whose total weight of the fed objects to be weighed falls within a predetermined weight range, and discharging the objects to be weighed from the containing chambers forming the determined combination.

15. A combination weigher according to claim 1, wherein the combination hoppers are weighing hoppers each comprising two weighing chambers, and each of the weighing hoppers is capable of weighing the weight of the objects to be weighed fed into each of the weighing chambers and independently discharging the objects to be weighed fed into each of the weighing chambers, the control means performing a combination calculation performed for each of the groups of combination hoppers on a basis of the weight of the objects to be weighed fed into the weighing chambers of the weighing hoppers, determining a combination of the weighing chambers of the weighing hoppers whose total weight of the fed objects to be weighed falls within a predetermined weight range, and discharging the objects to be weighed from the weighing chambers forming the determined combination.

16. A combination weigher according to claim 1, wherein a plurality of weighing hoppers are provided above the combination hoppers corresponding to the combination hoppers, respectively, the weighing hoppers each comprising two weighing chambers, and each of the weighing hoppers is capable of weighing the weight of the objects to be weighed fed into each of the weighing chambers and independently discharging the objects to be weighed fed into each of the weighing chambers, the combination hoppers are memory hoppers each comprising two containing chambers corresponding to the weighing chambers of the corresponding weighing hoppers, respectively, the objects to be weighed being separately fed into the containing chambers from the corresponding weighing chambers of the corresponding weighing hoppers, the memory hoppers being capable of independently discharging the objects to be weighed fed into each of the containing chambers thereof, the control means performing a combination calculation performed for each of the groups of combination hoppers on a basis of the weight of the objects to be weighed fed into the containing chambers of the memory hoppers, determining a combination of the containing chambers of the memory hoppers whose total weight of the fed objects to be weighed falls within a predetermined weight range, and discharging the objects to be weighed from the containing chambers forming the determined combination.

17. An apparatus for combination weighing and packaging, comprising:

N groups of combination hoppers, the groups comprising a plurality hopper lines having arcuate sections and comprising a line of combination hoppers positioned circularly for receiving objects to be weighed, wherein N is a plural number;

N collecting chutes, each of the collecting chutes disposed below a corresponding one of the groups of combination hoppers, each of the collecting chutes arranged to collect objects discharged from the corresponding group of combination hoppers, each of the collecting chutes having a lower portion defining an outlet arranged to discharge the objects;

N collecting hoppers, each of the collecting hoppers provided at the outlet of a corresponding one of the collecting chutes and associated with the corresponding one of the groups of combination hoppers, each of the collecting chutes arranged to temporarily retain the objects discharged from the outlet of the corresponding collecting chute, each of the collecting hoppers further arranged to discharge the objects;

a packaging machine having a single inlet disposed below the collecting hoppers and arranged to receive via the inlet the objects discharged from the collecting hoppers;

a control means for repeatedly carrying out, with respect to the groups of combination hoppers and the corresponding collecting hoppers, a series of processes including:

a combination process for performing a combination calculation on a basis of the weight of the objects fed into each combination hopper of the groups of combination hoppers and determining a single combination of the combination hoppers that will cause the total weight of the objects fed into the groups of combination hoppers to fall within a predetermined weight range;

a discharge preparation process for discharging the objects from the combination hoppers forming the combination determined by the combination process; and a discharge process for discharging the objects from the collecting hoppers, discharged from the combination hoppers and retained in the collecting hoppers, the control means arranged to carry out the combination process and the discharge preparation process with respect to each of the groups of combination hoppers sequentially with a time difference 1/N of one operation cycle time, and arranged to carry out the discharge process with respect to each of the collecting hoppers sequentially with a time difference of 1/N of the one operation cycle time, the one operation cycle time being the time taken from the start of discharging of the objects from the combination hoppers forming the combination determined by the combination process, followed by feeding of the objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process.

18. An apparatus for combination weighing and packaging, comprising:

N groups of combination hoppers which are N hopper lines of arcuate sections composing a line of combination hoppers including a plurality of circularly arranged combination hoppers for receiving objects to be weighed, N being a plural number; and N collecting chutes disposed below the groups of combination hoppers to respectively correspond to the groups of combination hoppers, for collecting the objects to be weighed discharged from the combination hoppers of the corresponding groups of combination hoppers and discharging the same from an outlet provided in a lower portion thereof;

N collecting hoppers provided at the outlets of the collecting chutes to respectively correspond to the groups of combination hoppers and the collecting chutes, for temporarily retaining the objects to be weighed discharged from the outlets of the collecting chutes, and then discharging the objects to be weighed into an inlet of the packaging machine; and a control means for repeatedly carrying out, with respect to each weighing unit including the groups of combination hoppers and the corresponding collecting hoppers, a series of processes including a combination process for performing a combination calculation on a basis of the weight of the objects to be weighed in an arbitrary number of combination hoppers of all the combination hoppers constituting the groups of combination hoppers and determining a single combination of the combination hoppers which causes the total weight of the fed objects to be weighed fall within a predetermined weight range, a discharge preparation process for discharging the objects to be weighed from the combination hoppers forming the combination determined by the combination process, and a discharge process for discharging from the collecting hoppers the objects to be weighed, discharged from the combination hoppers and retained in the collecting hoppers, the control means carrying out the series of processes with respect to each weighing unit once in every 1/k, k being an integer of 2 or more, of one operation cycle time, and carrying out the series of processes with a time difference of 1/(k×N) of one operation cycle time according to a series of the weighing units, the one operation cycle time being the time taken from the start of discharging of the objects to be weighed from the combination hoppers forming the combination determined by the combination process, followed by feeding of the objects to be weighed into the combination hoppers forming the combination and subsequently performing a combination calculation in a next combination process at least by using the weight of the objects to be weighed in the combination hoppers forming the combination, until immediately before the start of discharging of the objects to be weighed from the combination hoppers forming the combination determined in the next combination process; and a packaging machine having a single inlet disposed below the collecting hoppers of said combination weigher so as to receive the objects to be weighed discharged from the collecting hoppers of said combination weigher.

* * * * *

UNITED STATES PATENT AND TRADEMARK OFFICE
CERTIFICATE OF CORRECTION

PATENT NO. : 7,566,837 B2
APPLICATION NO. : 11/575469
DATED : July 28, 2009
INVENTOR(S) : Shozo Kawanishi et al.

Page 1 of 1

It is certified that error appears in the above-identified patent and that said Letters Patent is hereby corrected as shown below:

<u>On the Title Page, Item (75) Inventors:</u>

Line 1 Please delete "Shozo Kawanishi, Nishinomiya (JP)" and replace with

-- Shozo Kawanishi, Nishinomiya-shi (JP) --.

Signed and Sealed this
Twenty-seventh Day of May, 2014

Michelle K. Lee
*Deputy Director of the United States Patent and Trademark Office*